US012265226B2

(12) United States Patent
Travers et al.

(10) Patent No.: US 12,265,226 B2
(45) Date of Patent: *Apr. 1, 2025

(54) AUGMENTED REALITY DISPLAY SYSTEM

(71) Applicant: Vuzix Corporation, West Henrietta, NY (US)

(72) Inventors: Paul Travers, Honeoye Falls, NY (US); Tyler Porter, Honeoye Falls, NY (US); Robert Schultz, Victor, NY (US); Gregory Moens, Penfield, NY (US); Connor Hack, Rochester, NY (US); Adalberto Perez Reyes, Rochester, NY (US); Kevin Lloyd, Pittsford, NY (US); Marc J. Krolczyk, Spencerport, NY (US); Michael J. Telek, Pittsford, NY (US); Paul A. Boris, Chester Springs, PA (US); Robert W. Gray, Rochester, NY (US); Alexander Kelly, Nassua, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,255

(22) Filed: Jan. 25, 2024

(65) Prior Publication Data
US 2024/0369840 A1    Nov. 7, 2024

Related U.S. Application Data

(63) Continuation of application No. 16/955,719, filed as application No. PCT/US2018/066240 on Dec. 18, 2018, now Pat. No. 11,921,289.

(Continued)

(51) Int. Cl.
G02B 27/01     (2006.01)
F21V 8/00      (2006.01)
(Continued)

(52) U.S. Cl.
CPC ....... *G02B 27/0172* (2013.01); *G02B 6/0026* (2013.01); *G02B 6/005* (2013.01);
(Continued)

(58) Field of Classification Search
CPC .... G02B 6/0026; G02B 6/005; G02B 6/0076; G02B 6/0086; G02B 6/0093;
(Continued)

(56) References Cited

U.S. PATENT DOCUMENTS 5,790,230 A  *  8/1998  Sved ................... A61F 9/025
                                                351/110
5,884,339 A  *  3/1999  Fukasawa ............ A63B 33/004
                                                2/446

(Continued)

FOREIGN PATENT DOCUMENTS

DE    202017103846 U1   9/2017
JP       2009539129 A   11/2009
(Continued)

OTHER PUBLICATIONS

Harvey et al. (1998) "Description of Diffraction Grating Behavior in Direction Cosine Space," Applied Optics 37(34): 8158-8160.
(Continued)

*Primary Examiner* — Robin J Mishler
*Assistant Examiner* — Cory A Almeida
(74) *Attorney, Agent, or Firm* — Harter Secrest & Emery LLP; Jacob D. Merrill, Esq.

(57) ABSTRACT

A personal display device for displaying virtual images to a wearer including a frame having a right temple section, a left temple section, a right eye see-through section, and a left eye see-through section; a projection display device connected to the frame; a processor connected to the projection display device and arranged within the left temple section or right temple section; and at least one waveguide stack module
(Continued)

connected to the frame, the at least one waveguide stack module being configured to receive image-bearing light beams from the projection display device.

20 Claims, 26 Drawing Sheets

Related U.S. Application Data

(60) Provisional application No. 62/608,222, filed on Dec. 20, 2017, provisional application No. 62/626,356, filed on Feb. 5, 2018.

(51) Int. Cl.
| | |
|---|---|
| *G02C 5/12* | (2006.01) |
| *G02C 5/22* | (2006.01) |
| *G02C 9/00* | (2006.01) |
| *G02C 11/00* | (2006.01) |
| *G06F 1/16* | (2006.01) |
| *G06F 3/01* | (2006.01) |
| *G06F 3/0354* | (2013.01) |
| *G06F 3/16* | (2006.01) |
| *H04R 1/08* | (2006.01) |

(52) U.S. Cl.
CPC ......... *G02B 6/0076* (2013.01); *G02B 6/0086* (2013.01); *G02B 6/0093* (2013.01); *G02B 27/0101* (2013.01); *G02B 27/0103* (2013.01); *G02B 27/0176* (2013.01); *G02C 5/12* (2013.01); *G02C 5/22* (2013.01); *G02C 11/10* (2013.01); *G06F 1/163* (2013.01); *G06F 3/011* (2013.01); *G06F 3/016* (2013.01); *G06F 3/03547* (2013.01); *G06F 3/167* (2013.01); *H04R 1/08* (2013.01); *G02B 2027/0118* (2013.01); *G02B 2027/0134* (2013.01); *G02B 2027/0138* (2013.01); *G02B 2027/014* (2013.01); *G02B 2027/0174* (2013.01); *G02B 2027/0178* (2013.01); *G02C 9/00* (2013.01); *H04R 2499/15* (2013.01)

(58) Field of Classification Search
CPC ............ G02B 27/0101; G02B 27/0103; G02B 27/0172; G02B 27/0176; G02B 2027/0118; G02B 2027/0134; G02B 2027/0138; G02B 2027/014; G02B 2027/0174; G02B 2027/0178; G02C 5/12; G02C 5/22; G02C 9/00; G02C 11/10; G06F 1/163; G06F 3/011; G06F 3/016; G06F 3/03547; G06F 3/167; H04R 1/08; H04R 2499/15
See application file for complete search history.

(56) References Cited

U.S. PATENT DOCUMENTS

| | | | | |
|---|---|---|---|---|
| 8,164,886 | B1* | 4/2012 | Shelander | G06F 1/1601 |
| | | | | 250/221 |
| 9,128,281 | B2 | 9/2015 | Osterhout et al. | |
| 9,482,883 | B1* | 11/2016 | Meisenholder | G02C 5/146 |
| 9,823,744 | B2 | 11/2017 | Publicover et al. | |
| 9,846,308 | B2 | 12/2017 | Osterhout | |
| 10,139,626 | B2 | 11/2018 | Dobschal et al. | |
| 10,168,555 | B1 | 1/2019 | Cazalet et al. | |
| 10,180,572 | B2 | 1/2019 | Osterhout et al. | |
| 10,823,969 | B1* | 11/2020 | Hoover | H01M 10/653 |
| 11,150,480 | B1* | 10/2021 | Ebert | G02B 27/0176 |
| 2006/0042820 | A1* | 3/2006 | Lin | H05K 1/028 |
| | | | | 174/117 F |
| 2009/0059501 | A1* | 3/2009 | Yamaguchi | G02B 27/0176 |
| | | | | 361/679.3 |
| 2010/0045928 | A1* | 2/2010 | Levy | G02C 11/10 |
| | | | | 351/158 |
| 2010/0079356 | A1* | 4/2010 | Hoellwarth | G06T 19/006 |
| | | | | 345/8 |
| 2011/0019145 | A1* | 1/2011 | Sheldon | G02C 11/00 |
| | | | | 351/44 |
| 2012/0256865 | A1* | 10/2012 | Hashimoto | G06F 3/041 |
| | | | | 345/173 |
| 2013/0127980 | A1* | 5/2013 | Haddick | G06F 3/013 |
| | | | | 348/14.08 |
| 2013/0278631 | A1 | 10/2013 | Border et al. | |
| 2014/0098009 | A1 | 4/2014 | Prest et al. | |
| 2014/0211322 | A1 | 7/2014 | Bohn et al. | |
| 2015/0138224 | A1 | 5/2015 | Kim et al. | |
| 2015/0275557 | A1* | 10/2015 | Adair | E05D 11/0081 |
| | | | | 16/334 |
| 2015/0317830 | A1* | 11/2015 | Kihara | A61B 8/462 |
| | | | | 345/156 |
| 2016/0019423 | A1 | 1/2016 | Oritz et al. | |
| 2016/0070343 | A1 | 3/2016 | Li | |
| 2016/0077338 | A1 | 3/2016 | Robbins et al. | |
| 2016/0216792 | A1* | 7/2016 | Ogawa | G02B 27/0172 |
| 2016/0252728 | A1* | 9/2016 | Mack | G09G 5/373 |
| | | | | 351/158 |
| 2016/0266412 | A1* | 9/2016 | Yoshida | G02B 27/0172 |
| 2016/0267708 | A1 | 9/2016 | Nistico et al. | |
| 2016/0270656 | A1 | 9/2016 | Samec et al. | |
| 2016/0286210 | A1 | 9/2016 | Border et al. | |
| 2017/0017083 | A1* | 1/2017 | Samec | A61B 5/1455 |
| 2017/0031181 | A1* | 2/2017 | Blum | G02C 7/101 |
| 2017/0060177 | A1* | 3/2017 | Rahim | G02B 27/0176 |
| 2017/0184949 | A1 | 6/2017 | Takagi et al. | |
| 2017/0289230 | A1 | 10/2017 | Farrell et al. | |
| 2017/0322421 | A1* | 11/2017 | Hunter | G02B 27/0176 |
| 2017/0344114 | A1 | 11/2017 | Osterhout et al. | |
| 2017/0351121 | A1* | 12/2017 | Wang | G02C 5/146 |
| 2018/0000648 | A1* | 1/2018 | McCulloch | H05B 3/06 |
| 2018/0095299 | A1 | 4/2018 | Cazalet et al. | |
| 2018/0136491 | A1* | 5/2018 | Ashwood | G02C 11/08 |
| 2018/0335629 | A1* | 11/2018 | Cheng | G09G 3/24 |
| 2019/0025587 | A1 | 1/2019 | Osterhout et al. | |
| 2019/0107870 | A1* | 4/2019 | Ali | G06F 1/203 |
| 2019/0258073 | A1* | 8/2019 | Sissom | H04N 9/3167 |
| 2020/0133011 | A1* | 4/2020 | Kamakura | G02C 5/122 |
| 2020/0267378 | A1* | 8/2020 | Kuronuma | H04N 5/64 |
| 2020/0341282 | A1* | 10/2020 | Mills | G02C 5/2272 |

FOREIGN PATENT DOCUMENTS

| | | |
|---|---|---|
| JP | 2014224847 A | 4/2014 |
| JP | 2015125222 A | 6/2015 |
| JP | 2017120384 A | 6/2015 |
| JP | 2015184560 A | 10/2015 |
| JP | 2016126188 A | 7/2016 |
| JP | 2016541018 A | 12/2016 |
| JP | 2017120302 A | 7/2017 |
| JP | 2017120336 A | 7/2017 |
| JP | 2017120348 A | 7/2017 |
| JP | 2017146619 A | 8/2017 |
| WO | 2013049248 A2 | 4/2013 |
| WO | 20150170555 A1 | 11/2015 |
| WO | 2017120341 A1 | 7/2017 |

OTHER PUBLICATIONS

International Search Report and Written Opinion in corresponding PCT application No. PCT/US2018/066240, dated Mar. 6, 2019, 19 pages.
Wikipedia (accessed Jul. 2021) "Optical Head Mounted Display," 3 pages.
Wikipedia (accessed Jul. 2021) "Holographic Optical Element," 3 pages.
Wikipedia (accessed Jul. 2021) "Smartglasses in Section Human Computer Interface (HCI) control input," 5 pages.
Wikipedia (accessed Jul. 2021) "Wired Glove," 2 pages.

(56) References Cited

OTHER PUBLICATIONS

Wikipedia (accessed Jul. 2021) "Stray Light," 1 page.
Wikipedia (accessed Jul. 2021) "Light Leak," 1 page.
YouTube (Apr. 2017) "HiAR Glasses | HiScene," available online at https://www.youtube.com/watch?v=7pVlxgldSb0.
YouTube (Aug. 2017) "World's Most Smart Glasses Projection Display menu, hidden HD camera, Touch pad/Slide control," available online at https://www.youtube.com/watch?v=FcsOm2FZluE.

\* cited by examiner

AUGMENTED REALITY DISPLAY SYSTEM

CROSS-REFERENCE TO RELATED APPLICATIONS

This patent application is a continuation, and claims the priority benefit of U.S. patent application Ser. No. 16/955,719, filed Jun. 18, 2020 entitled "AUGMENTED REALITY DISPLAY SYSTEM", which is a U.S. national phase application under 35 U.S.C. § 371 of International Patent Application No. PCT/US2018/066240, filed Dec. 18, 2018, entitled "AUGMENTED REALITY DISPLAY SYSTEM", which claims the priority benefit of U.S. Provisional Patent Application No. 62/608,222, filed Dec. 20, 2017, entitled "AUGMENTED REALITY DISPLAY SYSTEM" and U.S. Provisional Patent Application No. 62/626,356, filed Feb. 5, 2018, entitled "AUGMENTED REALITY DISPLAY SYSTEM", each of which is incorporated herein by reference in its entirety for all purposes.

TECHNICAL FIELD

The present disclosure relates to an apparatus and method for an augmented reality eyewear display system.

BACKGROUND

Head-Mounted Displays (HMDs) are being developed for a range of diverse uses, including military, commercial, industrial, firefighting, and entertainment applications. For many of these applications, there is particular value in forming a virtual image that can be visually superimposed over the real-world image that lies in the field of view of the HMD user. Optical imaging light guides convey image-bearing light to the user in a narrow space for directing the virtual image to the user's pupil and enabling this superposition function.

Currently, HMDs have many issues that decrease the effectiveness of the HMDs. For example, HMDs are very costly, have heating issues, and may develop condensate around the waveguides.

Advantageously, embodiments of the present disclosure may provide an optical imaging apparatus that forms a virtual image that may be overlaid onto the real-world view that a user of the optical imaging apparatus perceives when looking through the optical imaging apparatus with at least one eye. The present disclosure may further coordinate and interact with multiple artificial intelligence (AI) systems to monitor the user and the environment of the user and to provide feedback information to the user based, in part, on past user behavior including online and real-world behavior. This enhances the user's safety and efficiency including tasks to be performed, decision making, and entertainment.

Therefore, a need exists for augmented reality display systems that assist users more effectively while and reducing costs of the augmented reality display systems.

BRIEF SUMMARY OF THE INVENTION

The present disclosure provides a personal display device for displaying virtual images to a wearer. The personal display device includes a frame having a right temple section, a left temple section, a right rear section, and a left rear section; a projection display device connected to the frame for projecting an image to the wearer; at least one waveguide stack module connected to the frame for propagating image-bearing light beams along a length of the at least one waveguide stack module, the at least one waveguide stack module being configured to receive the image from the projection display device, the at least one waveguide stack module including: an in-coupling diffractive optic formed along the at least one waveguide stack module for diffracting the image-bearing light beams from the projection display device into the at least one waveguide stack module for propagating the image-bearing light beams along the length of the at least one waveguide stack module in an angularly encoded form; and an out-coupling diffractive optic spaced apart from the in-coupling diffractive optic along the length of the at least one waveguide stack module for diffracting the image-bearing light beams from the at least one waveguide stack module in an angularly decoded form for viewing the image from the projection display device; a processor connected to the projection display device of the personal display device, the processor being configured to provide the image to the projection display device and the at least one waveguide stack module; a touchpad connected to the processor of the personal display device, the touchpad being configured to sense touch motions of the wearer and to provide input touchpad signals to the processor, the input touchpad signals changing at least one state of the personal display device, the touch motions of the wearer sensed by the touchpad including sensing directions of the touch motions of the wearer; and at least one microphone connected to the processor of the personal display device, the at least one microphone being configured to receive commands from the wearer, the at least one microphone being further configured to provide input microphone signals to the processor, the input microphone signals changing at least one state of the personal display device.

A further configuration is disclosed wherein the personal display device includes a vibrator connected to the processor of the personal display device, the vibrator being configured to receive input vibrator signals from the processor to provide haptic feedback to the wearer; the in-coupling diffractive optic and the out-coupling diffractive optic having front and back surfaces, the front surface of the in-coupling diffractive optic being parallel to the back surface of the in-coupling diffractive optic, the front surface of the out-coupling diffractive optic being parallel to the back surface of the out-coupling diffractive optic; the personal display device including a nose bridge assembly detachably attached to the frame between the right eye see-through section and the left eye see-through section; the personal display device including an ambient light sensor connected to the frame and the processor to detect a change in ambient light; the ambient light sensor being configured to provide signals to the processor; the processor being configured to change the image conveyed by the projection display device based on the signals provided by the ambient light sensor; the waveguide stack module further including a waveguide housing, the waveguide housing being configured to house the in-coupling diffractive optic and the out-coupling diffractive optic; the waveguide stack module including a blackening material to absorb excess light from the projection display device that goes past the in-coupling diffractive optic; the blackening material may be made of at least one of komoto, carbonfeather, Aktar, and black paints; the waveguide housing including a waveguide-frame aligner to align the waveguide housing and the frame of the personal display device; the waveguide stack module further including an outer cover and an inner cover to seal the in-coupling diffractive optic and the out-coupling diffractive optic within the waveguide housing; the outer cover and the inner cover including gaskets that surround the perimeters of the outer cover and the inner cover, the gaskets sealing the outer cover and the inner cover to the waveguide housing; the projector display device including a projector, a projector mounting frame, and a display connection module; the projector mounting frame including an alignment pin and a projector-frame aligner, the projector-frame aligner aligning the projector mounting frame and the frame of the personal display; the waveguide stack module further including a waveguide housing, the waveguide housing including a waveguide-frame aligner to align the waveguide housing and the frame of the personal display device, wherein the projector display device includes a projector mounting frame, the projector mounting frame including a projector-frame aligner aligning the projector mounting frame and the frame of the personal display, and wherein the frame of the personal display device includes a projector-waveguide-frame aligner to align the waveguide-frame aligner and the projector-frame aligner to the frame of the personal display device; the personal display device including a left hinge system positioned between the left temple section and the left rear section of the frame of the personal display device and a right hinge system positioned between the right temple section and the right rear section of the frame of the personal display device; the left hinge system and the right hinge system including a flex cable, a hinge, a hinge housing, and a hinge pin; the hinge including a first half hinge and a second half hinge, the first half hinge and the second half hinge being configured to be pivotally connected by the hinge pin; and the flex cable including at least six points of bend, four of the at least six points of bend of the flex cable being configured to surround the hinge pin.

BRIEF DESCRIPTION OF THE SEVERAL VIEWS OF THE DRAWING(S)

The accompanying drawings, which are included to provide further understanding of the present invention disclosed in the present disclosure and are incorporated in and constitute a part of this specification, illustrate aspects of the present invention and together with the description serve to explain the principles of the present invention. In the drawings.

DETAILED DESCRIPTION OF THE INVENTION

Figure 1:
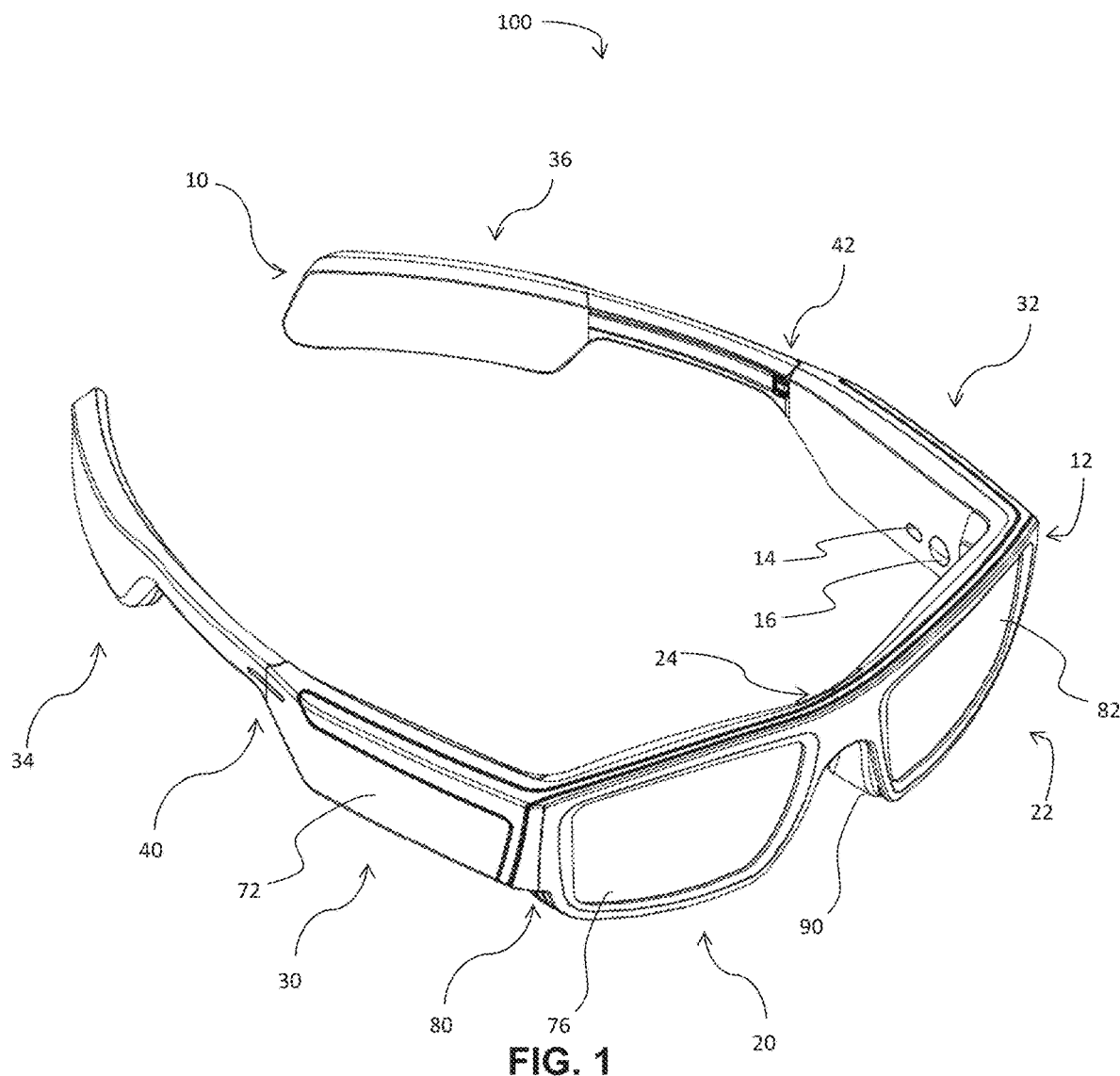
FIG. 1 is a perspective view of an augmented reality glasses.
Figure 2:
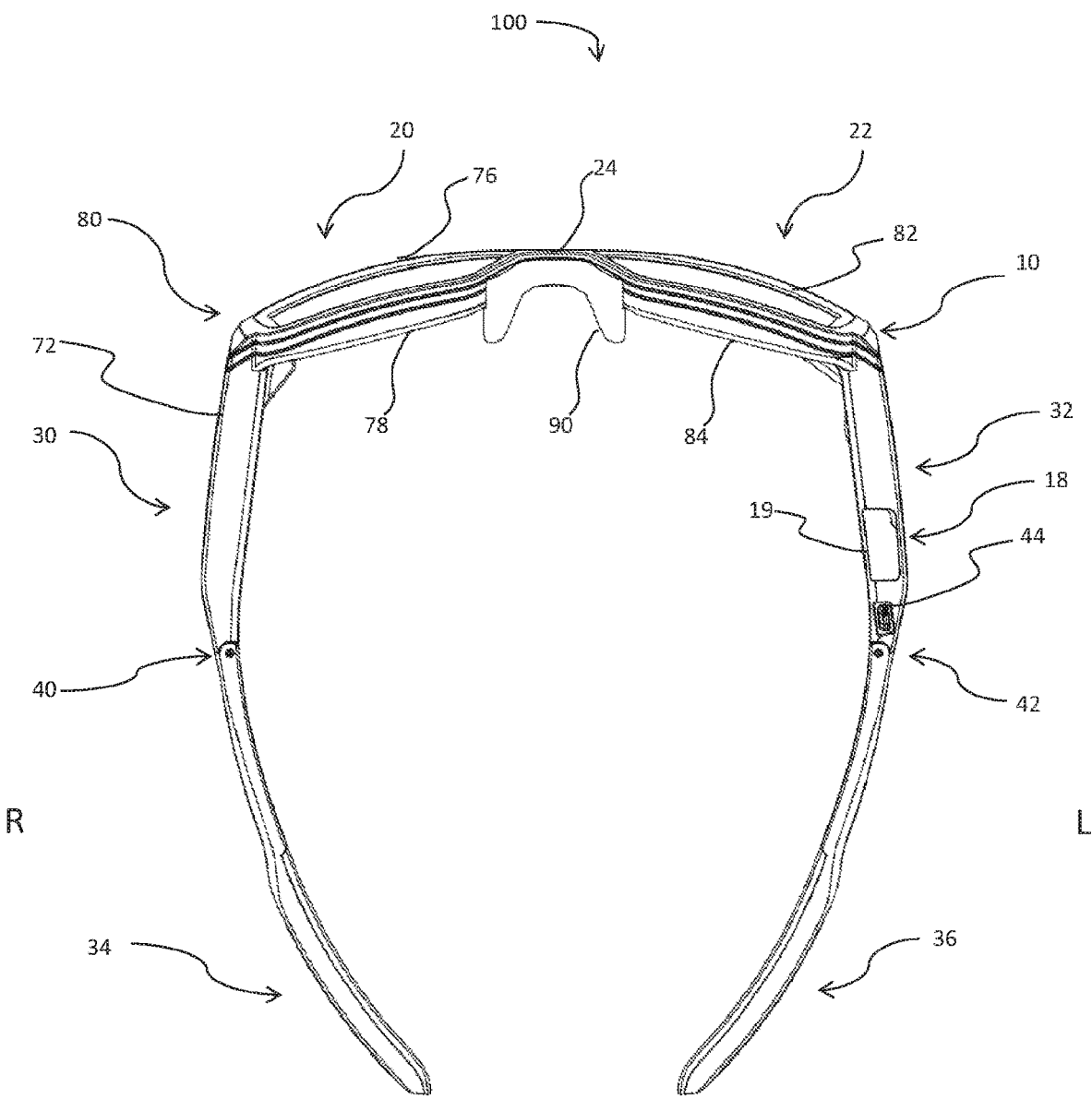
FIG. 2 is a bottom elevational view of the augmented reality glasses.
Figure 3:
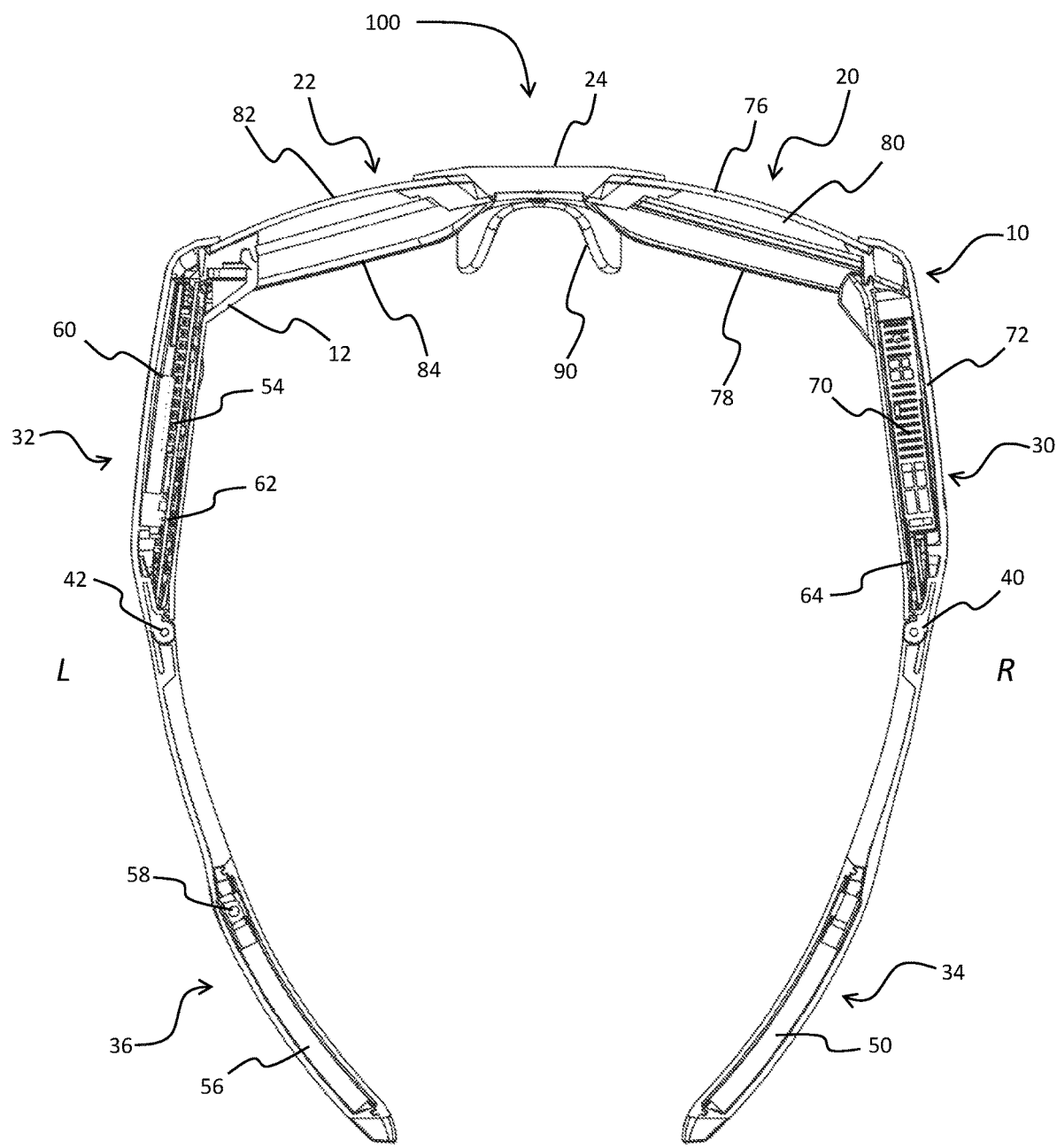
FIG. 3 is a top cross-sectional view of the augmented reality glasses.
Figure 4:
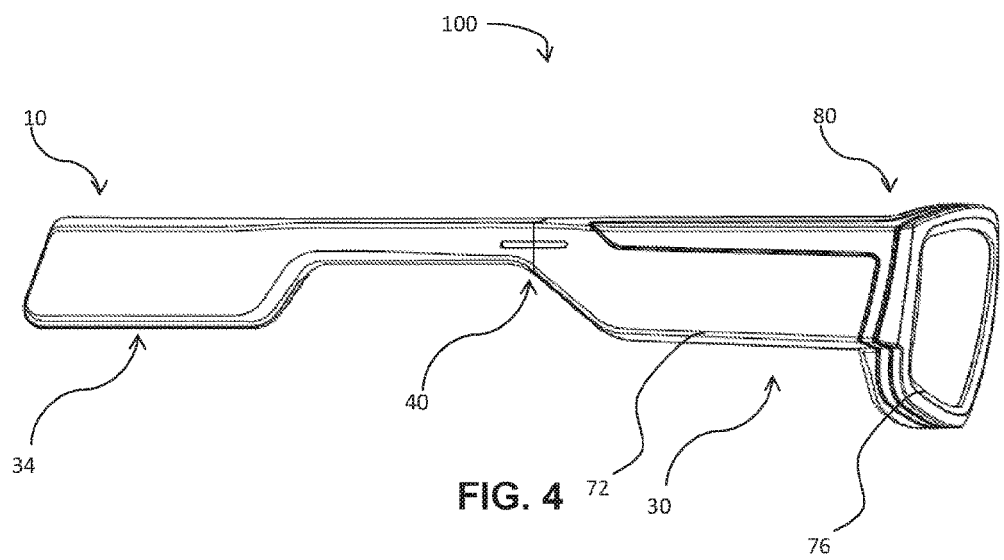
FIG. 4 is a side elevational view of the augmented reality glasses.
Figure 5:
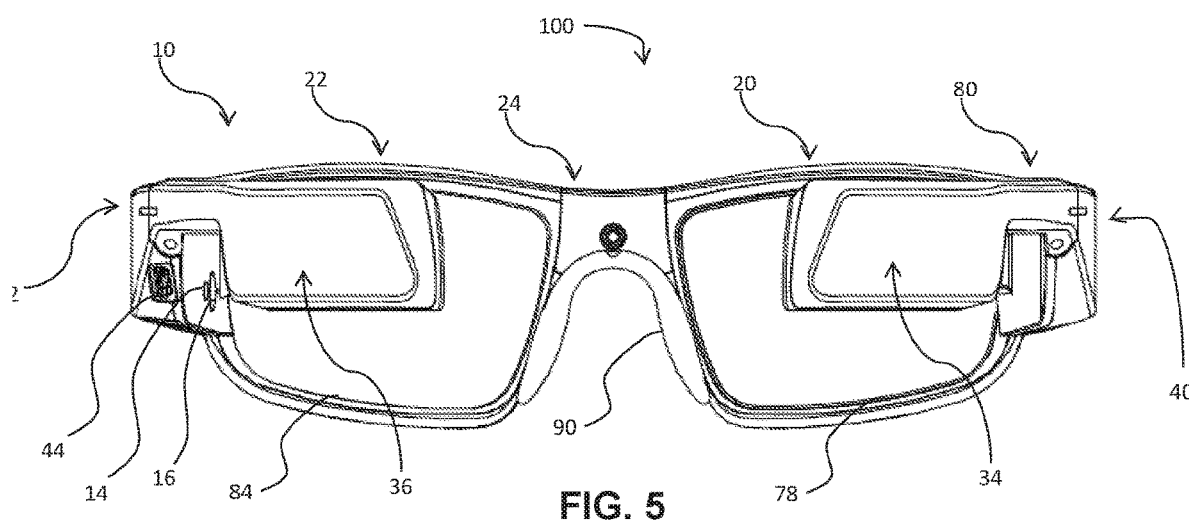
FIG. 5 is a rear elevational view of the augmented reality glasses.

The detailed description set forth below is intended as a description of various configurations of the present invention and is not intended to represent the only configurations in which the present invention may be practiced. It will be apparent, however, to those of ordinary skill in the art that the present invention is not limited to the specific details set forth herein and may be practiced without these specific details.

Where they are used herein, the terms "first," "second," and so on, do not necessarily denote any ordinal, sequential, or priority relation, but are simply used to more clearly distinguish one element or set of elements from another, unless specified otherwise.

By "exemplary" is meant to be "an example of," not intended to suggest any preferred or ideal embodiment.

The term "set," as used herein, refers to a non-empty set, as the concept of a collection of elements or members of a set is widely understood in elementary mathematics. The term "subset," unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the terms "wavelength band" and "wavelength range" are equivalent and have their standard connotation as used by those skilled in the art of color imaging and refer to a continuous range of light wavelengths that are used to represent polychromatic images. Different wavelength bands are directed through different color channels, such as to provide red, green, and blue primary colors in conventional color imaging applications.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus.

The terms "beam expander" and "pupil expander" are considered to be synonymous, used interchangeably herein. These terms are used generally herein to indicate a planar waveguide with diffraction gratings used for forming a virtual image, as described subsequently.

An essentially planar optical waveguide (e.g., a parallel plate waveguide) is a physical structure that may be used to convey image bearing optical light from one region of the waveguide to other regions of the waveguide. Typical applications for such image conveying waveguides are head mounted monocular or binocular display systems.

The terms "rigidly" and "rigidly connecting" are used to indicate components that are mechanically rigid or stiff. It is to be understood that all rigid mechanical materials and systems have the ability deform without breaking to various degrees.

The term "flexible electronics circuit", "flexible cable", and "flexible circuit" are used to indicate a length of a flexible material capable of delivering one or more electrical or optical signals from a proximal end to a distal end of said flexible material. Additionally, electrical and or optical energy may be transported from said proximal to distal ends. Further, it is to be understood that the direction, proximal to distal, may be reversed such that said signals and/or power may be delivered from said distal end to said proximal end.

The term "display images" and "display virtual images" and "project images" and "project virtual images" and "present images" and "present virtual images" are used to describe the visual functionality of the augmented reality display system disclosed herein. It is to be understood that the augmented reality display system generates and presents to the user's eye virtual images as opposed to real images.

The term "user" and "wearer" may be used synonymously to refer to the person utilizing the optical imaging system, alternatively referred to as "the augmented reality display system" or "the near-eye display system," herein disclosed.

Referring to FIGS. 1-25, an augmented reality display system 100 is illustrated. The augmented reality display system 100 may include a frame 10 with a right side R and a left side L. The augmented reality display system 100 may further include a right eye see-through section 20, a left eye see-through section 22, and a nose bridge section 24 disposed between the right eye see-through section 20 and the left eye see-through section 22. The frame 10 may include a right temple section 30, a left temple section 32, a right rear section 34, and a left rear section 36. The right rear section 34 may be connected to the right temple section 30. The right temple section 30 may be connected to the right see-through section 20. The left rear section 36 may be connected to the left temple section 32. The left temple section 32 may be connected to the left see-through section 22.

The augmented reality display system 100 may further include a right pass-through hinge 40 and a left pass-through hinge 42. The right rear section 34 may be connected to right pass-through hinge 40 that may be connected to the right temple section 30. The left rear section 36 may be connected to the left pass-through hinge 42 that may be connected to the left temple section 32. The right pass-through hinge 40 and the left pass-through hinge 42 are further discussed below.

The right rear section 34 of the augmented reality display system 100 may include a right rear battery 50, a right vibration device 52, and a right flexible cable (not shown). The right flexible cable may be an electrical cable or any other connector suitable for the intended purpose and understood by one of ordinary skill in the art. The right flexible cable may connect the right rear battery 50 and the right vibration device 52. The right flexible cable may pass through the right rear section 34 and the right pass-through hinge 40, and may connect to a right circuit board 64. Another flexible cable (not shown) may connect the right circuit board 64 within the right temple section 30 and pass through the right eye see-through section 20, the nose bridge section 24, and the left see-through section 22 to connect to a processor 54 that may be disposed within the left temple region 32 of the augmented reality display system 100. The processor 54 may be a quad core ARM A53 or any other processor suitable for the intended purpose and understood by one of ordinary skill in the art.

The left rear section 36 of the augmented reality display system 100 may include a left rear battery 56, a left vibration device 58, and a left flexible cable (not shown). The left flexible cable may be an electrical cable or any other connector suitable for the intended purpose and understood by one of ordinary skill in the art. The left flexible cable may connect the left rear battery 56 and the left vibration device 58. The left flexible cable may pass through the left rear section 36 and the left pass-through hinge 42 and connect to the processor 54 of the augmented reality display system 100.

The right temple section 30 of the augmented reality display system 100 may further include a projection display device 70 and a touch pad 72. The projection display device 70 and the touch pad 72 may be connected to the processor 54 of the augmented reality display system 100. The projection display device 70 is further discussed below.

The touch pad 72 may allow a user to interact with the augmented reality display system 100 to change an image projected by the projection display device 70. The user may swipe (e.g., swiping of a finger in an upward, downward, sideways, diagonal, or inwardly direction like tapping) to signal to the processor 54 to change the image projected by the projection display device 70 and/or to change a state of the augmented reality display system 100. The touch pad 72 may also be configured to sense a change in pressure of the user (e.g., the user may press down on the touch pad 72) to change the image projected by the projection display device 70 and/or to change a state of the augmented reality display system 100. Signals and/or data from the touch pad 72 may be configured to: 1) initiate the start of software stored on memory (not shown) of the augmented reality display system 100; 2) initiate software of third party devices (not shown) in direct (e.g., wire) or remote (e.g., wireless; WiFi and/or Bluetooth) communication with the augmented reality display system 100; 3) initiate or terminate network communications with the third party devices; 4) initiate or terminate built-in devices or subsystems of the augmented reality display system 100 (e.g. camera, video recording, microphone, vibrators, projection system, sensors, and other devices or subsystems).

The right see-through section 20 of the augmented reality display system 100 may include a right outer cover 76, a right inner cover 78, and a waveguide stack module 80. The right outer cover 76, the right inner cover 78, and the waveguide stack module 80 will be further discussed below.

The left temple section 32 of the augmented reality display system 100 may include a left temple battery 60 that may be connected to the processor 54. The left temple battery 60 may also be connected to the processor 54 to provide additional battery power to the augmented reality display system 100.

The left see-through section 22 of the augmented reality display system 100 may include a left outer cover 82 and a left inner cover 84. The right outer cover 76, the right inner cover 78, the left outer cover 82, and the left inner cover 84 may be protective covers or any other cover suitable for the intended purpose and understood by one of ordinary skill in the art.

The right outer cover 76 and the left outer cover 82 may be electrically coupled to the processor 54. The processor 54 may be electrically coupled to the right rear battery 50, the left rear battery 56, and the left temple battery 60, which may be disposed within the augmented reality display system 100.

The right outer cover 76 and the left outer cover 82 may include at least electrochromic material, photochromic material, or any other material suitable for the intended purpose and understood by one of ordinary skill in the art. The electrochromic or photochromic material may be disposed between the right outer cover 76 and the right inner cover 78, and between the left outer cover 82 and the left inner cover 84. Electrochromic material, or photochromic material, may be disposed on the outer surfaces of the right outer cover 76 and the left outer cover 82. Electrochromic material, or photochromic material, may also be an additional surface to the waveguide stack module 80 disposed before the right outer cover 76 and the left outer cover 82, such that the right outer cover 76 and the left outer cover 82 may be the furthest surfaces of the waveguide stack module 80 from the user's eyes.

The right eye see-through section 20 of the augmented reality display system 100 may further include a polarizer (not shown) that may be disposed between the right outer cover 76 and the waveguide assembly 89. The polarizer may be disposed between the waveguide assembly 89 and the right inner cover 78. The polarizer may also be a circular polarizer. The polarizer may assist the augmented reality display system 100 in blocking reflected light from an inner surface of the right outer cover 76 from returning to the waveguide assembly 89, and thus, from entering an eye of the user.

The nose bridge section 24 of the augmented reality display system 100 may include a nose bridge assembly 90. The nose bridge assembly 90 may be detachable or in a fixed position. The nose bridge assembly 90 may include a lens securing assembly (not shown) to secure an optional prescription lens to the nose bridge section 24. The optional prescription lens may be positioned closer to the eyes of user, e.g., before the right inner cover 78 and the left inner cover 84 of the augmented reality display system 100.

The augmented reality display system 100 may further include a camera assembly 12. The camera assembly 12 may include a camera (not shown) and an ambient light sensor (not shown). The camera assembly 12 may be connected to the processor 54 of the augmented reality display system 100. The camera may provide data to the processor 54 to change the image displayed by the projection display device 70 of the augmented reality display system 100. The camera may be configured to capture images at a 1080 p resolution at 30 frames per second (FPS) or any other resolution and speed suitable for the intended purpose and understood by one of ordinary skill in the art.

Multiple cameras may also be positioned separately from one another to provide additional advantages such as stereoscopic imaging and front, side, and/or rear view imaging. The camera assembly 12 may be disposed within the right eye see-through section 20. Additional cameras may also be disposed within each of the left eye see-through section 22 and the right eye see-through section 20. Another camera may also be disposed within the nose bridge section 24. Other cameras may be disposed in at least one of the right rear section 34, the left rear section 36, the right temple section 30, the left temple section 32, the right eye see-through section 20, the left eye see-through section 22, and the nose bridge section 24.

At least one camera may be an infrared camera and/or an ultraviolet camera. At least another camera, together with supporting software, may also have self-focusing and/or zoom capabilities. "Zoom capability" may include the camera of the camera assembly 12 having the ability to change the optical power of the camera.

The processor 54 may be configured to receive data from the ambient light sensor to change the image projected by the projection display device 70. For example, when there is bright ambient light (e.g., a brightly lit room or outside on a sunny day), the contrast ratio and colors displayed by the projection display device 70 may be different from the contrast ratio and colors displayed when there is not bright ambient light (e.g., a dimly lit room or outside on a cloudy day or outside at night). Data from the ambient light sensor may be used to adjust the level of opacity of the right outer cover 76 and/or the left outer cover 82.

The augmented reality display system 100 may deliver an ambient light functionality to make it easier for the user to see a transparent display during difficult lighting conditions. The ambient light functionality may adjust the visual experience of the user between different states (e.g., "themes") based on the ambient lighting conditions.

When the data from the ambient light sensor reaches a user-defined threshold, the processor 54 may change the visual experience displayed to the user. The augmented reality display system 100 may display various themes on the waveguide stack module 80 that may address varying lighting conditions. For the augmented reality display system 100, "themes" may include varying colors, icons, and transparency percentages that may be applied by the processor 54.

Figure 6A:
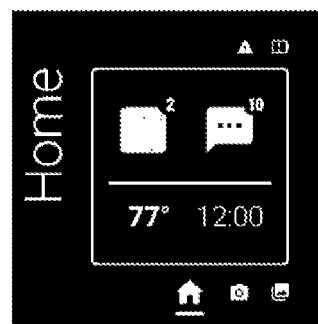
FIG. 6A is a first virtual image conveyed by the augmented reality glasses.
Figure 6B:
FIG. 6B is a second virtual image conveyed by the augmented reality glasses.
Figure 7:
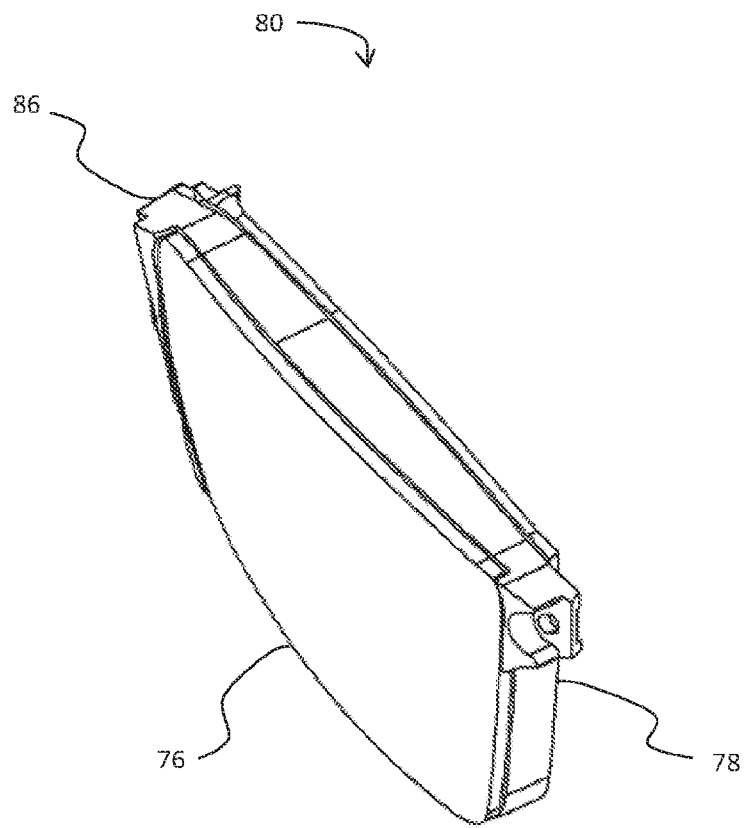
FIG. 7 is a perspective view of a waveguide stack module of the augmented reality glasses.
Figure 8:
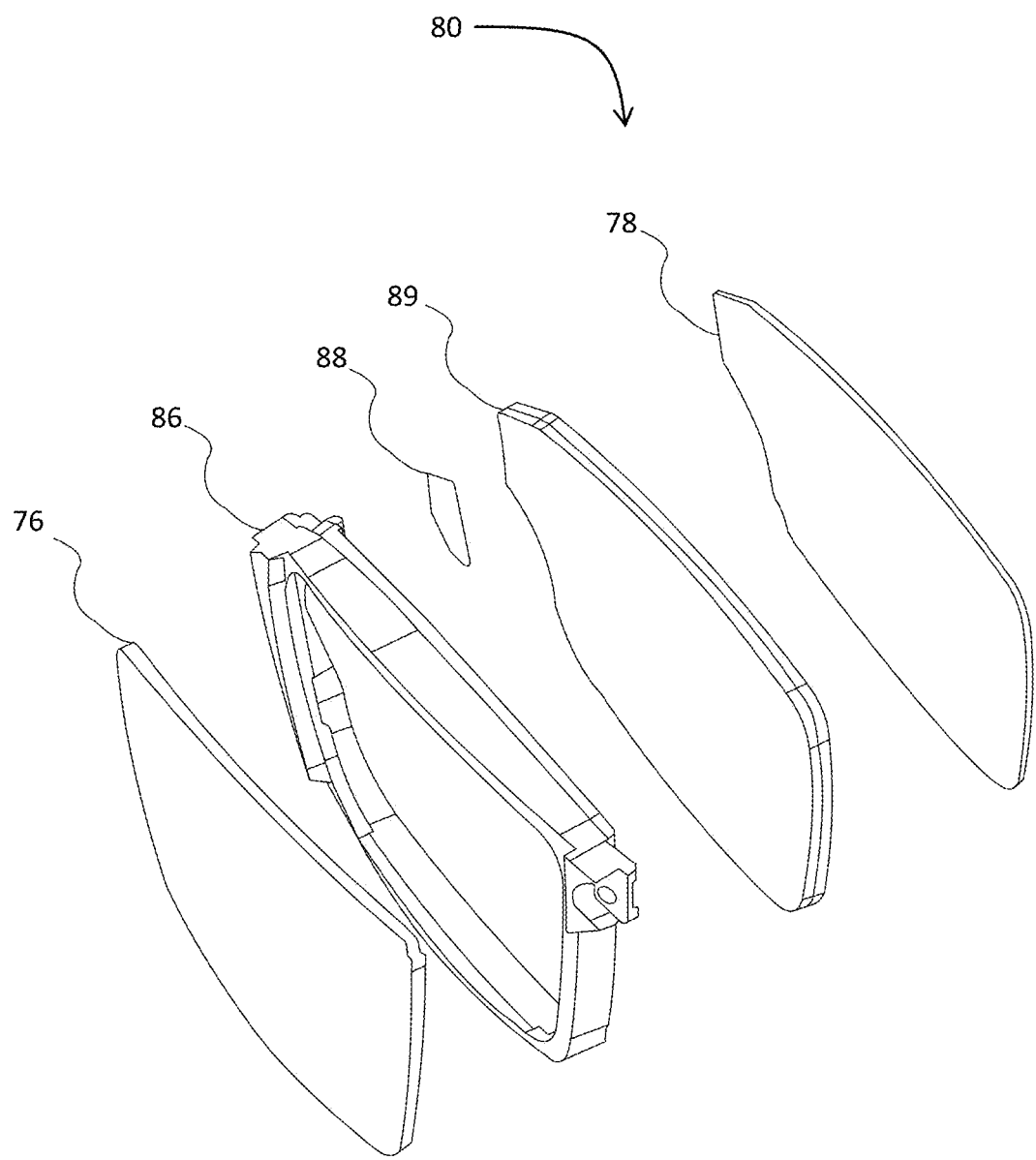
FIG. 8 is an expanded view of components that may be included in the waveguide stack module of the augmented reality glasses.
Figure 9:
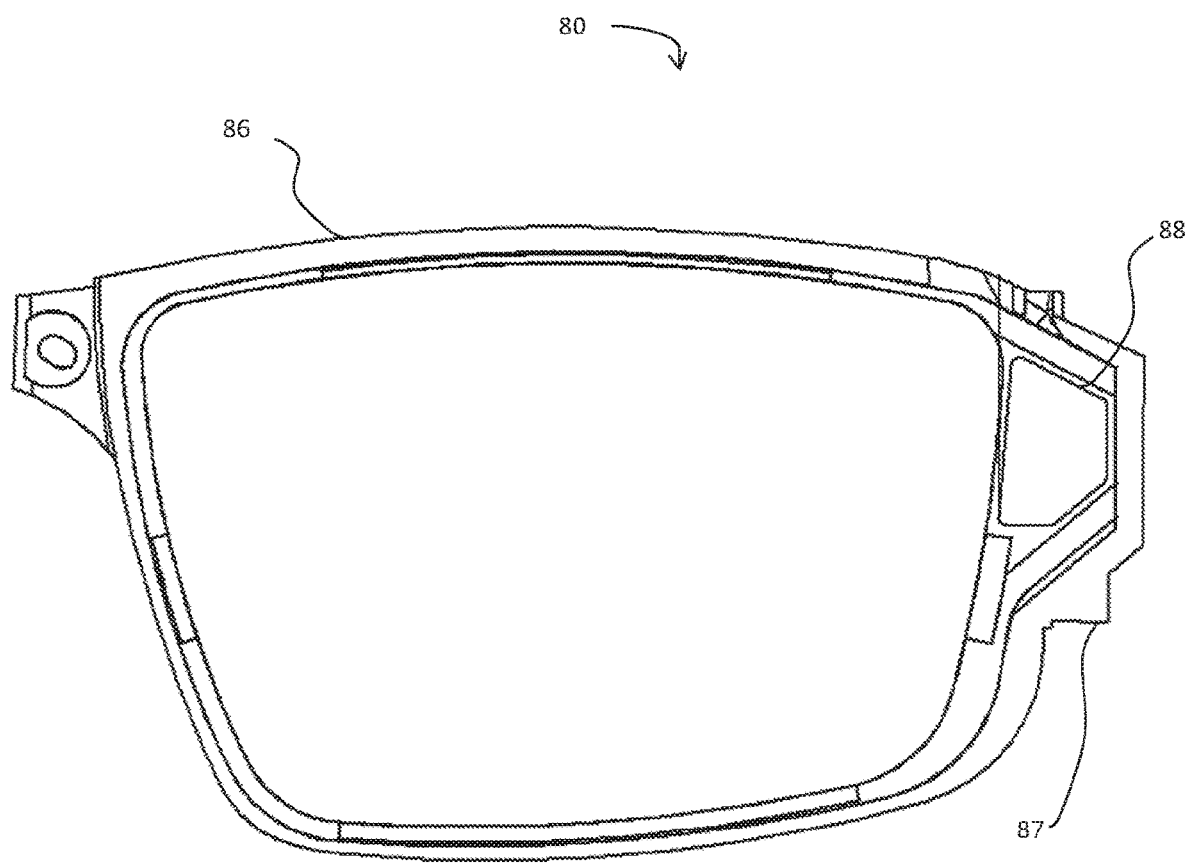
FIG. 9 is a rear elevational view of a waveguide housing and a blackening material of the waveguide stack module of the augmented reality glasses.
Figure 10:
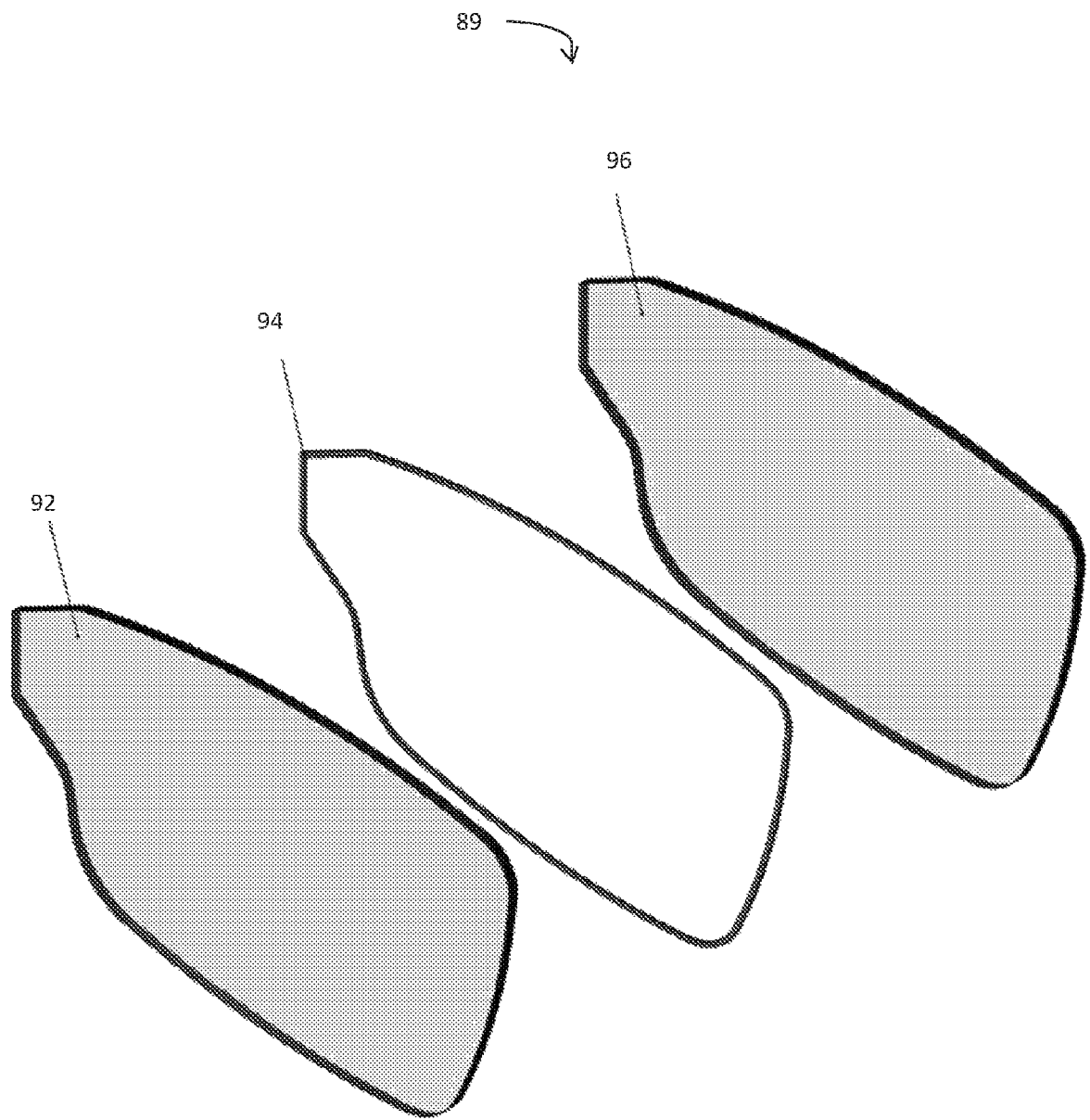
FIG. 10 is an expanded view of components that may be included in the waveguide assembly of the waveguide stack module.
Figure 11:
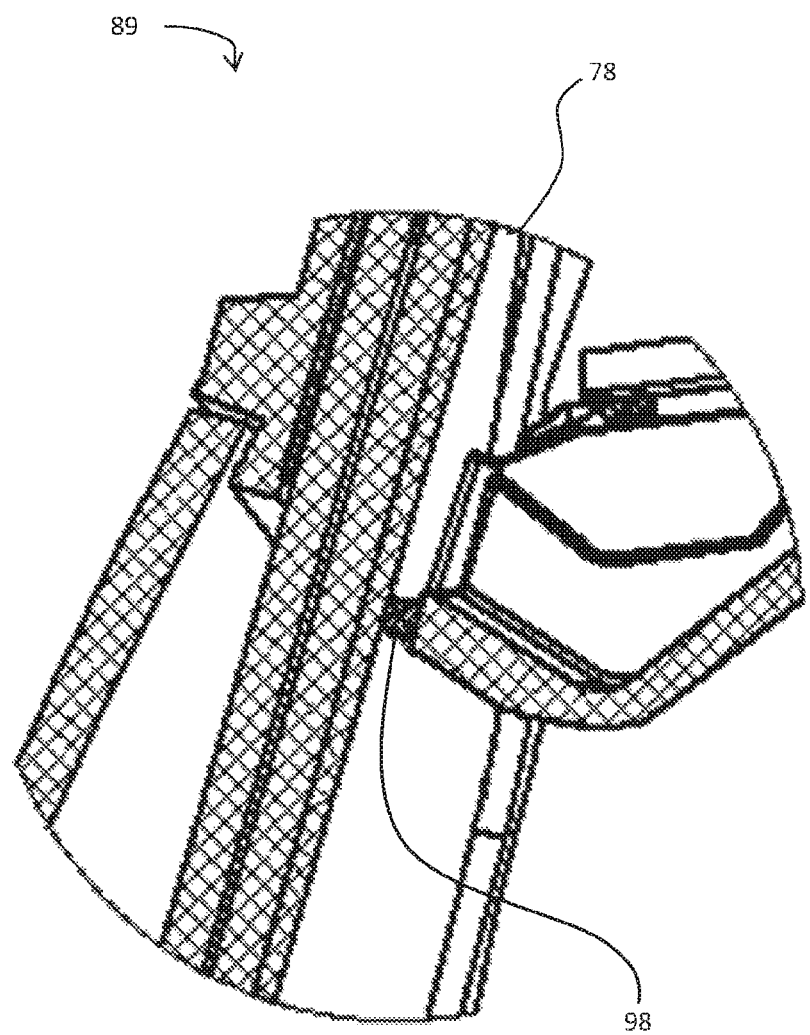
FIG. 11 is a top cross-sectional of the waveguide stack module including a gasket.

For example, FIGS. 6A and 6B are examples of "themes" utilizing the ambient light sensor that may be displayed and/or conveyed to the waveguide stack module 80. FIG. 6A may be a "dark theme" that may include more transparent "coloring" schemes that may be used when there is low-ambient lighting. This may prevent overwhelming the vision of the user with excessive brightness from the projection display device 70 when in a low-lighting setting. FIG. 6B may be a "light theme" that may provide a high-contrast "coloring" scheme that may be used for bright environments. Referring to FIGS. 6A and 6B, the color black may be a transparent portion of the displayed image of the augmented reality display system 100.

The augmented reality display system 100 may automatically utilize the ambient light functionality rather than being a selectable option by the user. Additionally, the "themes"/settings may always be dark, light, or automatic. The user-defined threshold setting may be defined as a range of ambient light levels that may trigger the change in theme. The user-defined threshold may also include a length of time sensed data above and below an ambient light level threshold before the processor triggers the change in theme. For example, if there is a sudden "flash of light" and the user-defined threshold is crossed, the switching of the theme is not performed due to the shortness of duration of the "flash of light." If a change in an ambient threshold is continuous for a defined period of time, the theme that may be displayed by the waveguide stack module 80 may then be switched.

The augmented reality display system 100 may further include a third flexible cable (not shown) that may connect the processor 54 to the projection display system 70 and may pass through cavities (not shown) within the left eye see-through section 22, the nose bridge section 24, and the right eye see-through section 20. The third flexible cable may be an electrical cable or any other cable suitable for the intended purpose and understood by one of ordinary skill in the art.

Additional flexible cables (not shown) may be disposed in the right temple section 30 and pass through the right eye see-through section 20, the nose bridge section 24, the left eye see-through section 22, and the left temple section 32. Additional flexible cables may connect one or more components disposed in the right side R to one or more components in the left side L of the augmented reality display system 100.

The augmented reality display system 100 may further include a memory card slot 18, a memory card slot cover 19, internal memory (not shown; e.g., 4 GB flash memory), system RAM (not shown; e.g., 512 MB), and an access port 44 (e.g., a micro USB access port) to establish an external connection (e.g., USB 2.0 high speed connection) to the processor 54. The memory card slot 18 may be configured to receive a secure digital (SD) card, a MiniSD card, a CompactFlash card, a Memory Stick, xD-Picture card, or any other memory medium suitable for the intended purpose and understood by one of ordinary skill in the art. The memory card slot cover 19 may provide sealed access to the memory card slot 18. For example, the memory card slot cover 19 may be waterproof or water-resistant.

The left temple section 32 of the augmented reality display system 100 may further include an outward microphone port (not shown) and inward microphone port (not shown) that may be utilize to change the images displayed by the projection display device 70. The outward microphone port and the inward microphone port may send data to the processor 54 that may change the image displayed by the projection display device 70. For example, the user may audibly say "next," which would change the image displayed by the projection display device 70 to the next image.

Where a microphone port is available, an associated microphone may be disposed at the microphone port and connected to an electrical power source (e.g., the left temple battery 60) and the processor 54 that may receive electrical audio signals from the associated microphone. The associated microphone may receive sound principally through the microphone port.

One or more microphone ports and associated microphones may further be disposed in the right temple section 30. Other positions of the one or more microphone ports and the associated microphones may include the nose bridge section 24, the right rear section 34, the left rear section 36, the right eye see-through section 20, and the left eye see-through section 22. Multiple microphones may be utilized for background and environmental noise cancelation as well as to alert the wearer of potential environmental hazards.

Voice commands from the user may also initiate the software stored on the augmented reality display system 100 and/or the software of the third party devices in direct or remote communication with the augmented reality display system 100. The voice commands may further change the state of the built-in device or subsystem (e.g. a camera of camera assembly 12 or a projector of the projection display device 70) of the augmented reality display system 100 or power on/off the augmented reality display system 100. The voice commands may also either change the state of the augmented reality display system 100 or initiate a change of state of the augmented reality display system 100. For example, when the microphone is "on," the voice commands may initialize the microphone to provide data to the processor 54, thereby changing the state of the augmented reality display system 100. Other examples of changing states of the augmented reality display system 100 with the voice commands may include changing the images displayed by the waveguide stack module 80 and capturing images by the camera assembly 12.

The left temple section 32 of the augmented reality display system 100 may further include an indicator port 14 (e.g., an LED indicator port) and a power button 16 to activate the augmented reality display system 100. The indicator port 14 may indicate a power level, a status, or any other indication suitable for the intended purpose and understood by one of ordinary skill in the art.

The circuit board 62 of the augmented reality display system 100 may include the processor 54, a board memory module, an orientation sensor, an accelerometer sensor, a magneto sensor, an audio codec module, a wireless module, a chip antenna module, a camera connector, a barometric pressure sensor, a proximity sensor, etc.

Figure 25:
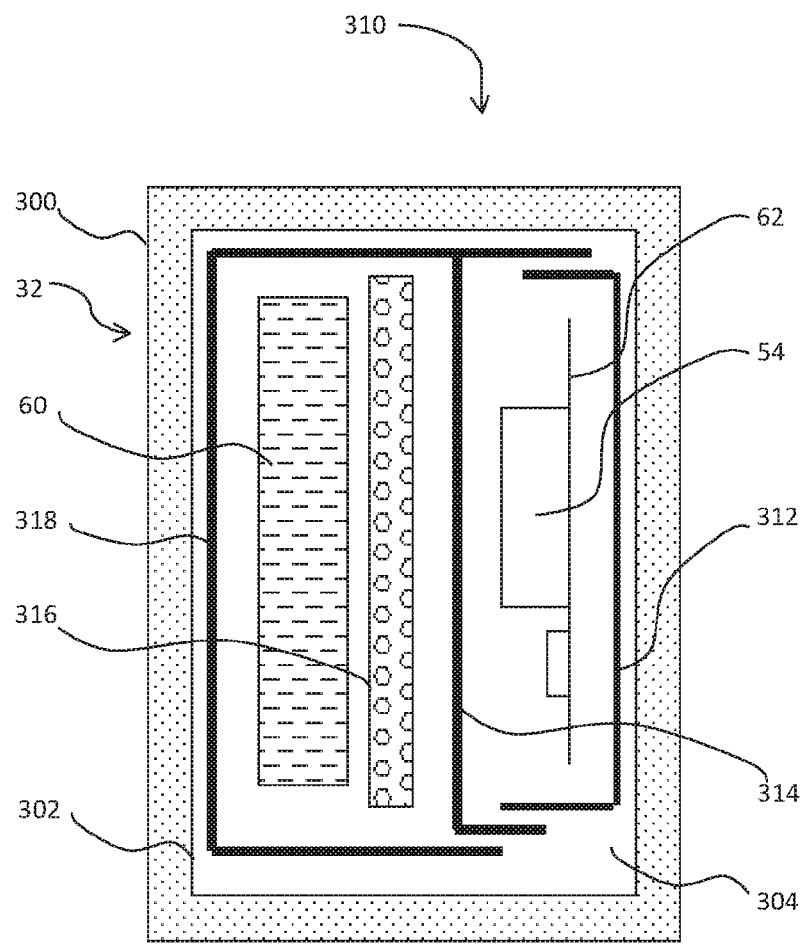
FIG. 25 is a cross-sectional view of a heat spreader system of the augmented reality glasses.

Referring to FIG. 25, FIG. 25 illustrates a cross-sectional back-to-front view of the left temple section 32. The left temple section 32 may have a left temple section outer surface 300 and a left temple section inner surface 302 that may form an inner cavity 304. The left temple section 32 may include a heat spreader system 310 that may be utilized to distribute heat generated by the processor 54 over the left temple section inner surface 302. The heat spreader system 310 prevents one or more local hot spots from developing that may damage the electrical components located in the left temple section 32 (e.g. the processor 54, the left temple battery 60, or other components on the circuit board 62). The heat spreader system 310 may also prevent discomfort that may be caused by the local hot spots to the wearer of the augmented reality display system 100.

The heat spreader system 310 may also include a first heat conductive sheet 312 disposed between at least a portion of the circuit board 62 and the left temple section inner surface 302. The first heat conductive sheet 312 may be in thermal and/or physical contact with the left temple section inner surface 302. The heat spreader system 310 may also have a second heat conductive sheet 314 disposed between at least a portion of the circuit board 62 and a portion of the left temple battery 60. The second heat conductive sheet 314 may be in thermal and/or physical contact with a portion of the left temple section inner surface 302.

The heat spreader system 310 may also have a thermal insulator 316 disposed between the second heat conductive sheet 314 and the left temple battery 60. The thermal insulator 316 may be composed of Acrogel, rubber, or any other material suitable for the intended purpose and understood by one of ordinary skill in the art. The heat spreader system 310 may also have a third heat conductive sheet 318 disposed between the left temple battery 60 and the left temple section inner surface 302. The third conductive sheet 318 may be in thermal and/or physical contact with the left temple section inner surface 302. The third conductive sheet 318 may also be in thermal and/or physical contact with at least a portion of the left temple battery 60.

The first heat conductive sheet 312, the second heat conductive sheet 314, and the third heat conductive sheet 318 may be in thermal and/or physical contact with one another. The first heat conductive sheet 312, the second heat conductive sheet 314, and the third heat conductive sheet 318 may be composed of copper, silver, gold, tin, aluminum, pure or composite material, or any other material suitable for the intended purpose and understood by one of ordinary skill in the art.

Waveguide Stack Module

Referring to FIGS. 7-11, the waveguide stack module 80 of the augmented reality display system 100 may be environmentally sealed to prevent moisture, dirt, and any other particles from getting inside the waveguide stack module 80 and effectively "ruining" the image provided by the projection display device 70. For example, the waveguide stack module 80 may be hermetically sealed. The waveguide stack module 80 of the augmented reality display system 100 may further include a waveguide housing 86, a waveguide-frame aligner 87, a blackening material 88, and a waveguide assembly 89.

The right outer cover 76 of the augmented reality display system 100 may also include an anti-reflective coating to assist in the reduction of unwanted reflections. This may allow a higher quality image to be displayed to the user. The right outer cover 76 may also include a full perimeter seal with the waveguide housing 86 to prevent any debris from entering the waveguide stack module 80. For example, glue or an adhesive may be applied to the perimeter of the right outer cover 76 to seal the right outer cover 76 to the waveguide housing 86.

The waveguide housing 86 of the waveguide stack module 80 may allow locations of other modules in the augmented reality display system 100 to be stacked, thereby reducing tolerance stacking in the augmented reality display system 100. The waveguide housing 86 may also be made of plastic, polycarbonate, a polymer, or any other material suitable for the intended purpose and understood by one of ordinary skill in the art.

The blackening material 88 of the waveguide stack module 80 may absorb excess light from the projection display device 70 that goes past the waveguide assembly 89 so that the excess light does not reflect back into the waveguide assembly 89. The blackening material 88 may be made of komoto, carbonfeather, Aktar, black paints, and any other material suitable for the intended purpose and understood by one of ordinary skill in the art. The blackening material 88 may also be at an angle normal to the waveguide assembly 89.

The waveguide assembly 89 of the waveguide stack module 80 may include at least one waveguide 92. The waveguide assembly 89 of the waveguide stack module 80 may also include two waveguides 92, 96 (or any other material/optic suitable for the intended purpose and understood by one of ordinary skill in the art) and a UV light activated material 94. The two waveguides 92, 96 may be separated by the UV light activated material 94 while maintaining parallelism suitable for optical performance of the waveguide assembly 89. Having better parallelism allows an image to have little to no color separation. The two waveguides 92, 96 may also have parallel front and back surfaces onto which one or more diffraction gratings may be disposed. The edges of the two waveguides 92, 96 and the UV light activated material 94 may be blackened to assist in the absorption of light. The UV light activated material 94 may also be a UV curable adhesive that may be applied around or near the perimeter of the two waveguides 92, 96. The UV light activated material 94 may provide a cavity between the two waveguides 92, 96 of the waveguide assembly 89.

The two waveguides 92, 96 may have in-coupling diffractive optic and an out-coupling diffractive optic. The two waveguides 92, 96 of the waveguide assembly 89 of the waveguide stack module 80 may further include at least one turning grating disposed between the in-coupling diffractive optic and the out-coupling diffractive optic. The in-coupling diffractive optic, the out-coupling diffractive optic, and/or the turning grating may include at least one of diffraction gratings, holographic optical elements, volume holograms, photonic crystals, photo-refractive crystals, polymers, dichromated gelatin, and photosensitive glass.

The right inner cover 78 of the waveguide stack module 80 may include an anti-reflective coating and a "smudge" proof coating. The different types of coatings may be applied to either side of the right inner cover 78. When dirt or oil is present directly on the two waveguides 92, 96, the image displayed on the waveguide stack module 80 is degraded. The right inner cover 78 may allow the quality of the image to be less affected by the environment.

The waveguide stack module 80 may also include a gasket 98 (e.g., a form-in place gasket) that may be in contact with the right inner cover 78 allowing for a better seal with the waveguide stack module 80. This may allow for an advantage of compliance in the gasket by not applying an excessive amount of pressure directly on the waveguide assembly 89. The gasket 98 may be made from Dymax GA 142 gasket material or any other material suitable for the intended purpose and understood by one of ordinary skill in the art.

In general, waveguides (e.g., parallel plate waveguides) are involved with total internal reflectance (TIR) including the bouncing of light within the waveguide material. If the surfaces of the parallel plate waveguide are dirty or there are points of pressure on the waveguide material, the TIR may be disrupted. The rear inner cover 78 having an anti-reflective coating provides an additional layer of protection. If the rear inner cover 78 has smudges, it will not affect the TIR as much as smudges directly on the waveguide assembly 89. This also may allow pressure to be applied to the waveguide assembly 89 through the gasket 98. The gasket 98 may assist in the creation of an environmental seal that keeps debris, moisture, and other unwanted particles from entering the optical path and degrading the image of the augmented reality display system 100. The compliance of the gasket 98 may also allow for flexing of the frame 10 while still maintaining the environmental seal.

Projection Display Device

Figure 12:
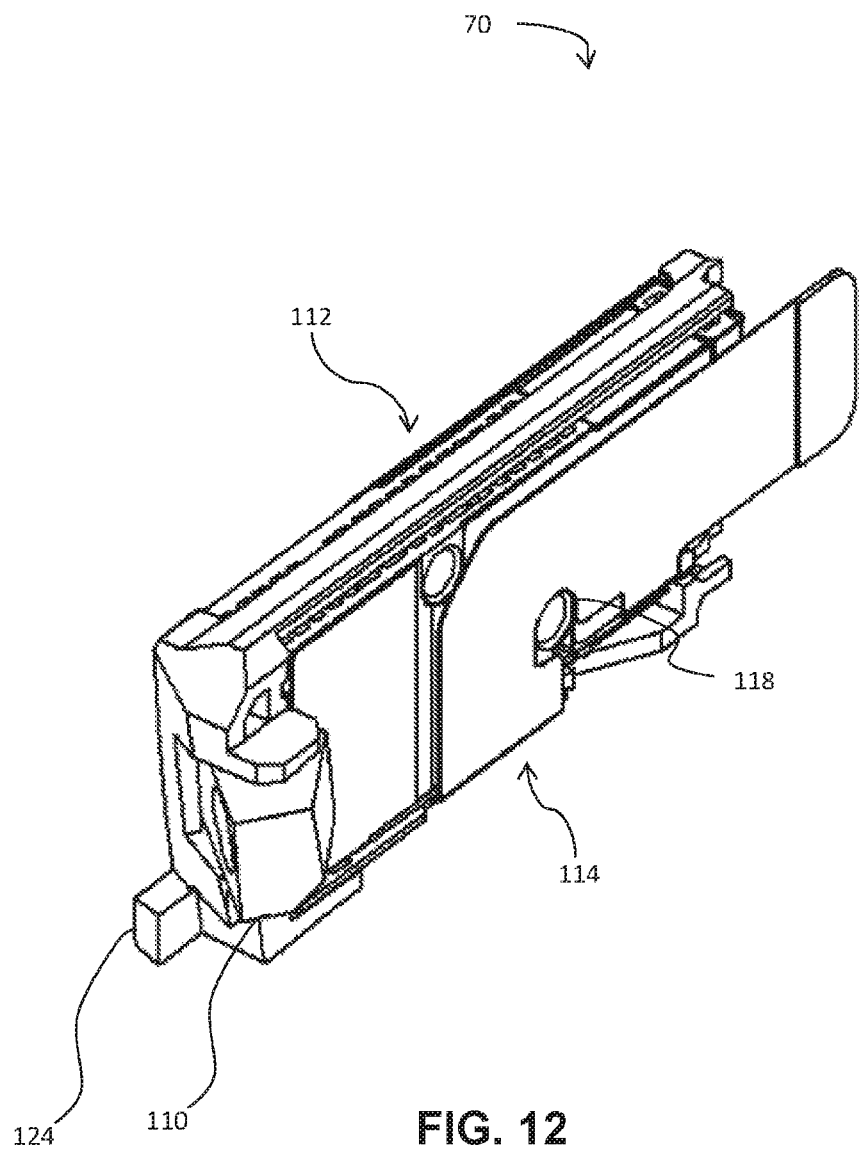
FIG. 12 is a perspective view of a projection display device of the augmented reality glasses.
Figure 13:
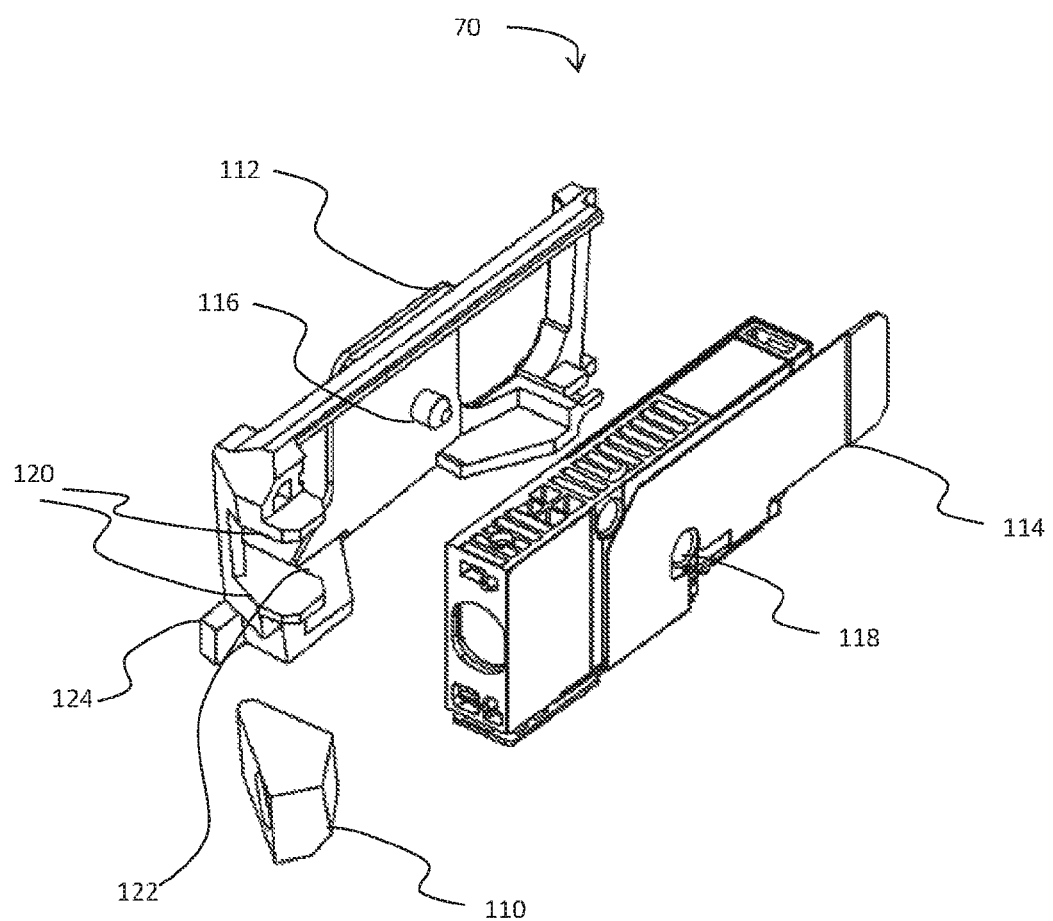
FIG. 13 is an expanded view of components that may be included in the projection display device of the augmented reality glasses.
Figure 14:
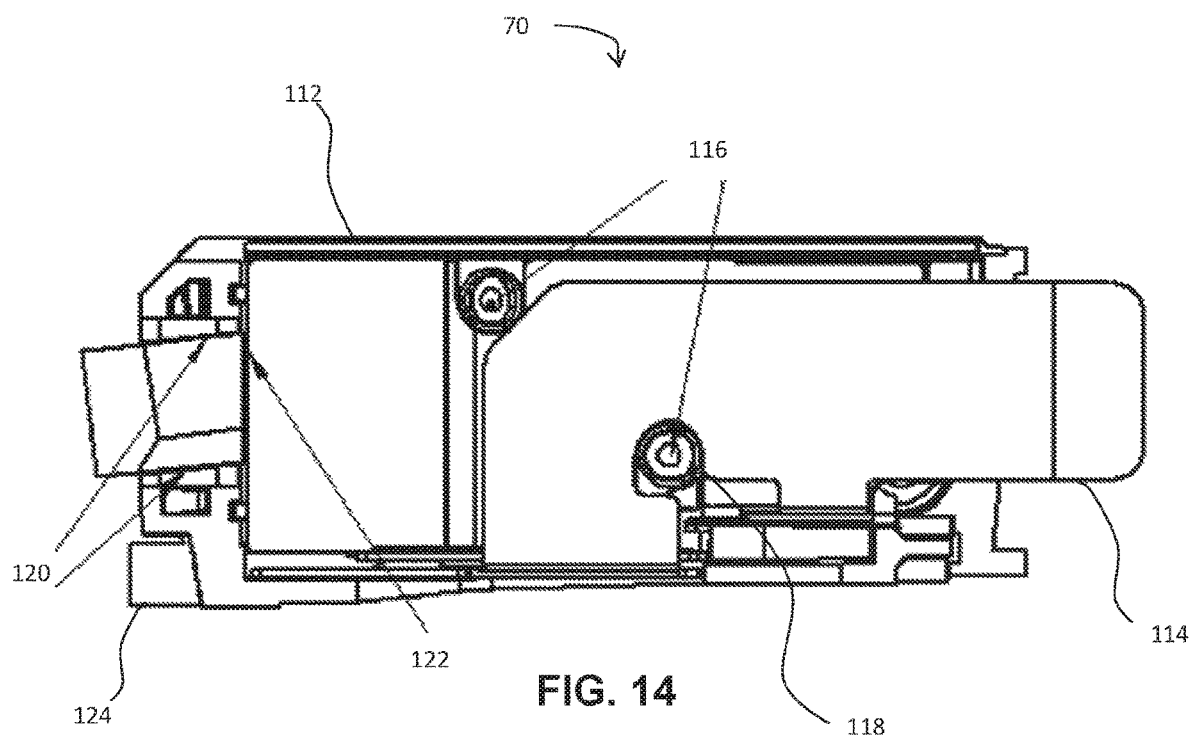
FIG. 14 is a side elevational view of the projection display device of the augmented reality glasses.

Referring to FIGS. 12-14, the projection display device 70 of the augmented reality display device 100 may include a projector mounting frame 112, a projector 114, an alignment pin 116, and an alignment aperture 118. The projector 114 may be a Vuzix Cobra 2 projector or any other projector suitable for the intended purpose and understood by one of ordinary skill in the art. The alignment aperture 118 being configured to receive the alignment pin 116 for aligning the projector 114 to the projector mounting frame 112.

The projection display device 70 may further include a display connection module 110 that may connect the projection display device 70 to the waveguide stack module 80. The display connection module 110 may be an optical connection module that may connect the projection display device 70 to the waveguide stack module 80. In one embodiment, the display connection module 110 may also be a prism assembly. The prism assembly may optically connect the projection display system 70 to the waveguide stack module 80. The prism assembly may also change the direction of light from the projection display system 70 to ensure that the light may have the correct in-coupling angles when the light impinges onto the in-coupling diffraction grating of a parallel plate waveguide of the waveguide stack module 80.

The projector mounting frame 112 may include prism alignment edges 120 and projector alignment edge 122 to align the display connection module 110 and the projector 114 to the projector mounting frame 112. The projector 114 may sit flat against the projector alignment edge 122 of the projector mounting frame 112. The projector mounting frame 112 may also include a projector-frame aligner 124.

Optics Assembly and Alignment

Figure 15:
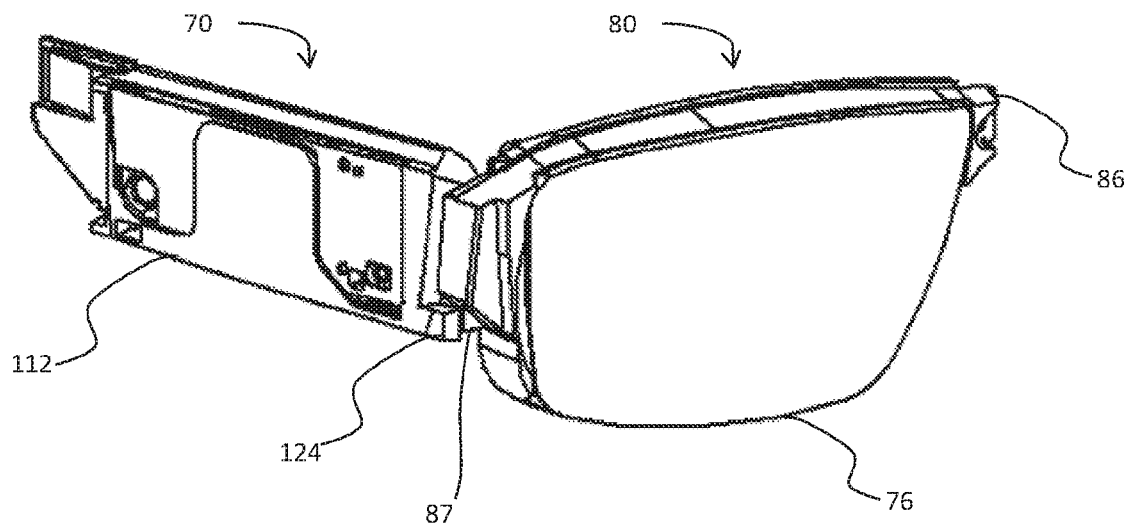
FIG. 15 is a perspective view of the waveguide stack module and the projector module of the augmented reality glasses.
Figure 16:
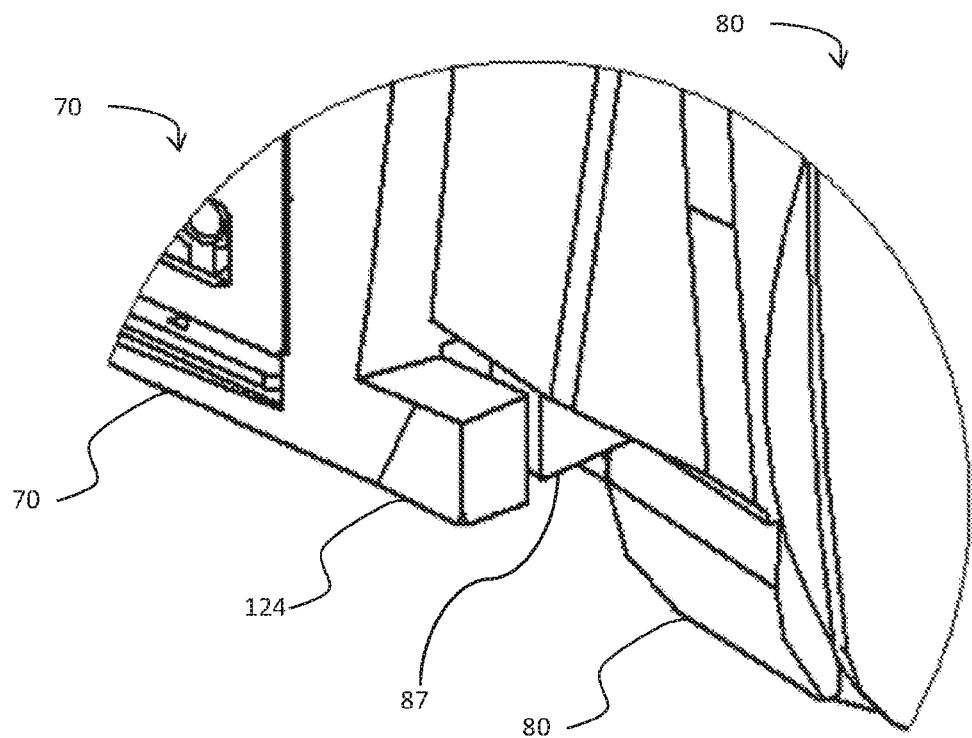
FIG. 16 is an exploded perspective view of the waveguide stack module and the projector module of the augmented reality glasses.
Figure 17:
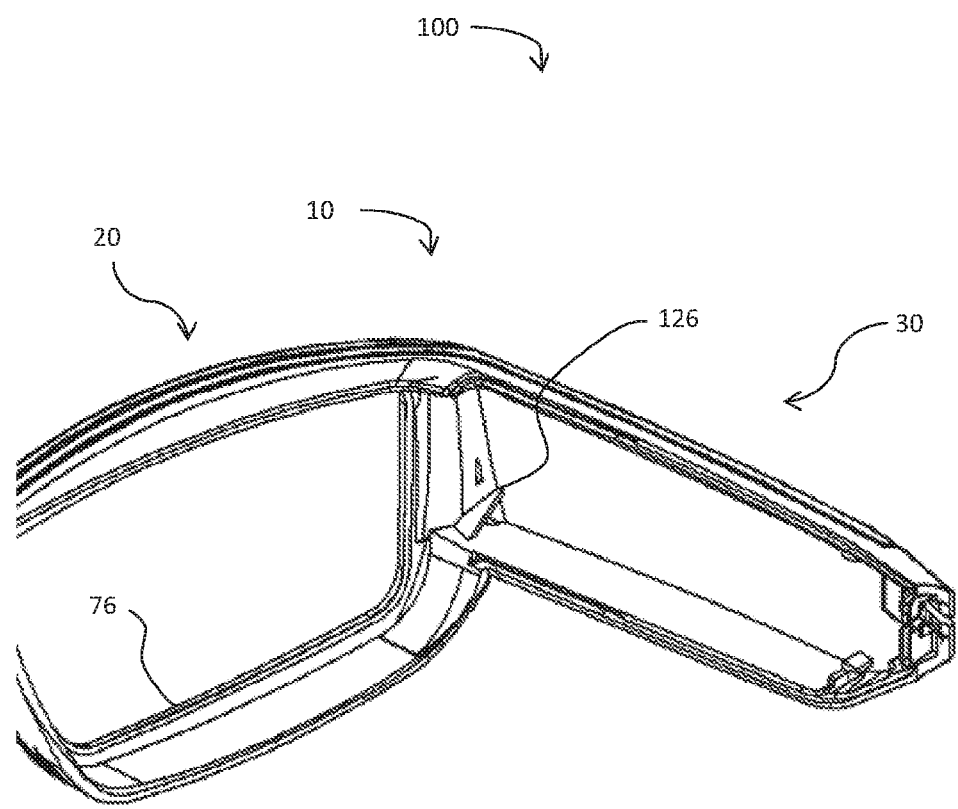
FIG. 17 is a perspective view of an interior region of a housing of the augmented reality glasses that may receive the waveguide stack module and the projector module.
Figure 18:
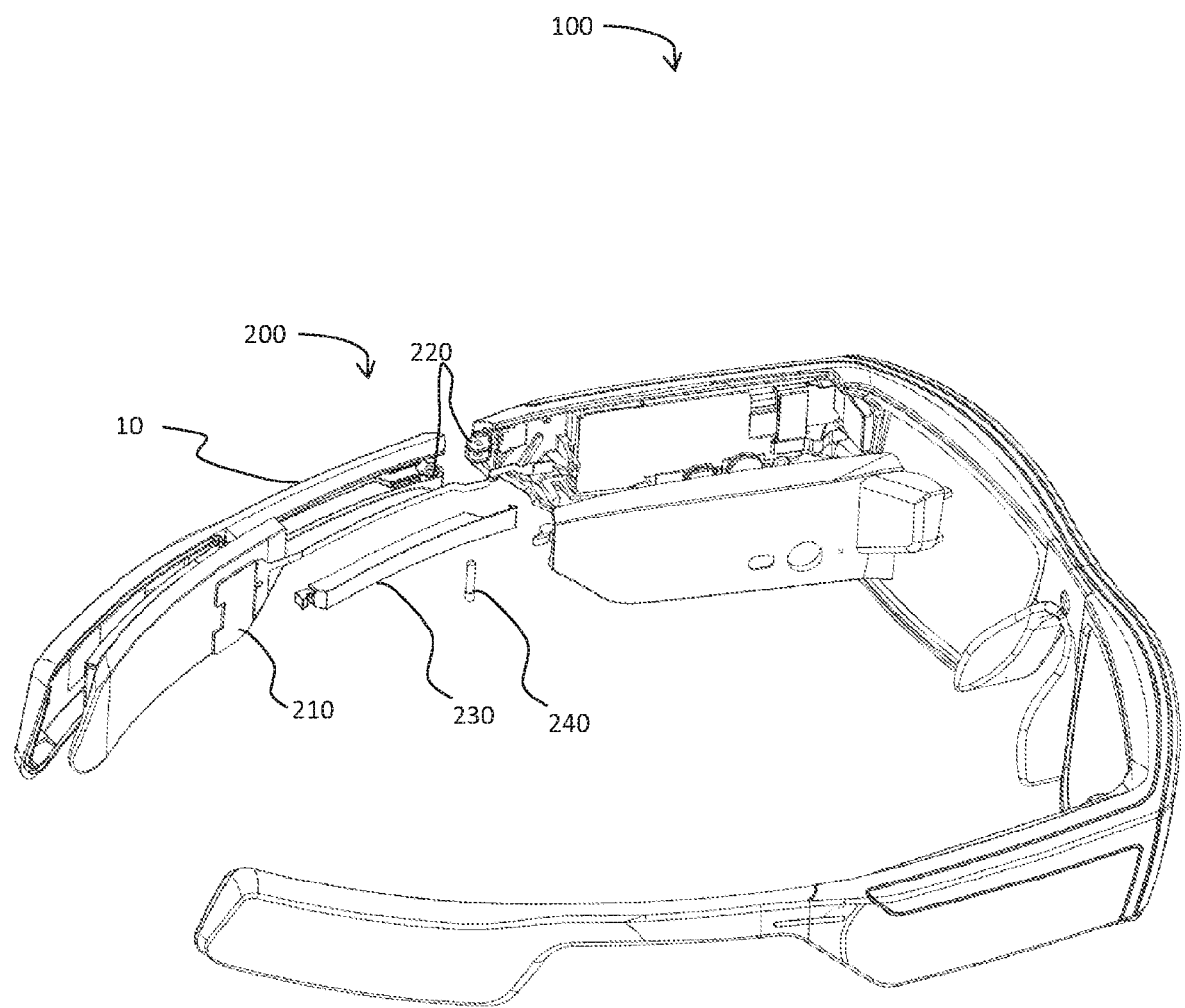
FIG. 18 is an expanded view of components including a hinge system of the augmented reality glasses.
Figure 19:
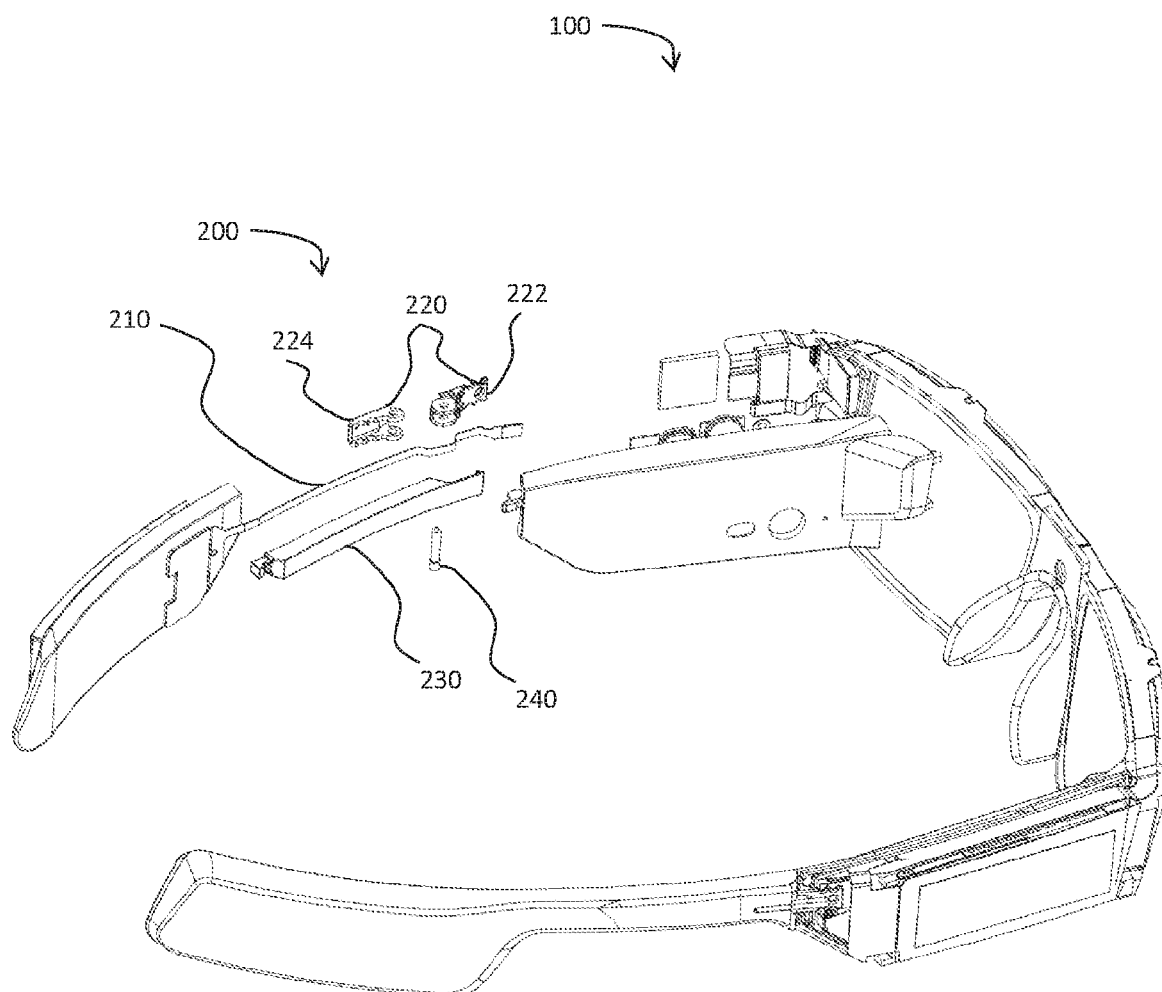
FIG. 19 is an expanded view of components without a portion of a top layer of the augmented reality glasses.
Figure 20:
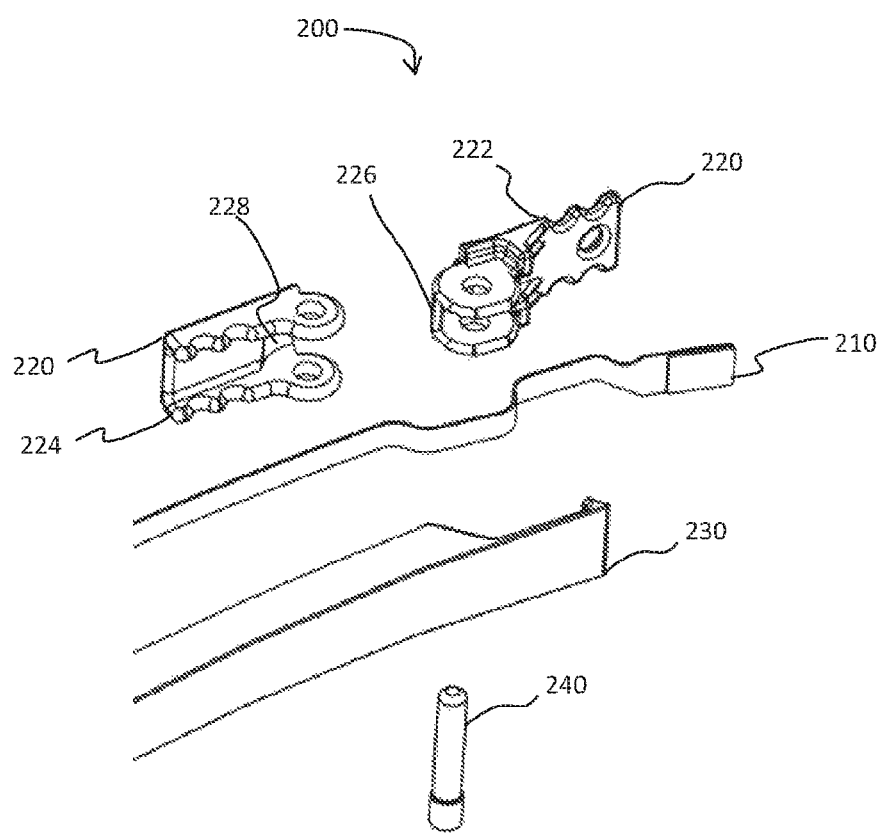
FIG. 20 is an expanded view of components of the hinge system of the augmented reality glasses.
Figure 21:
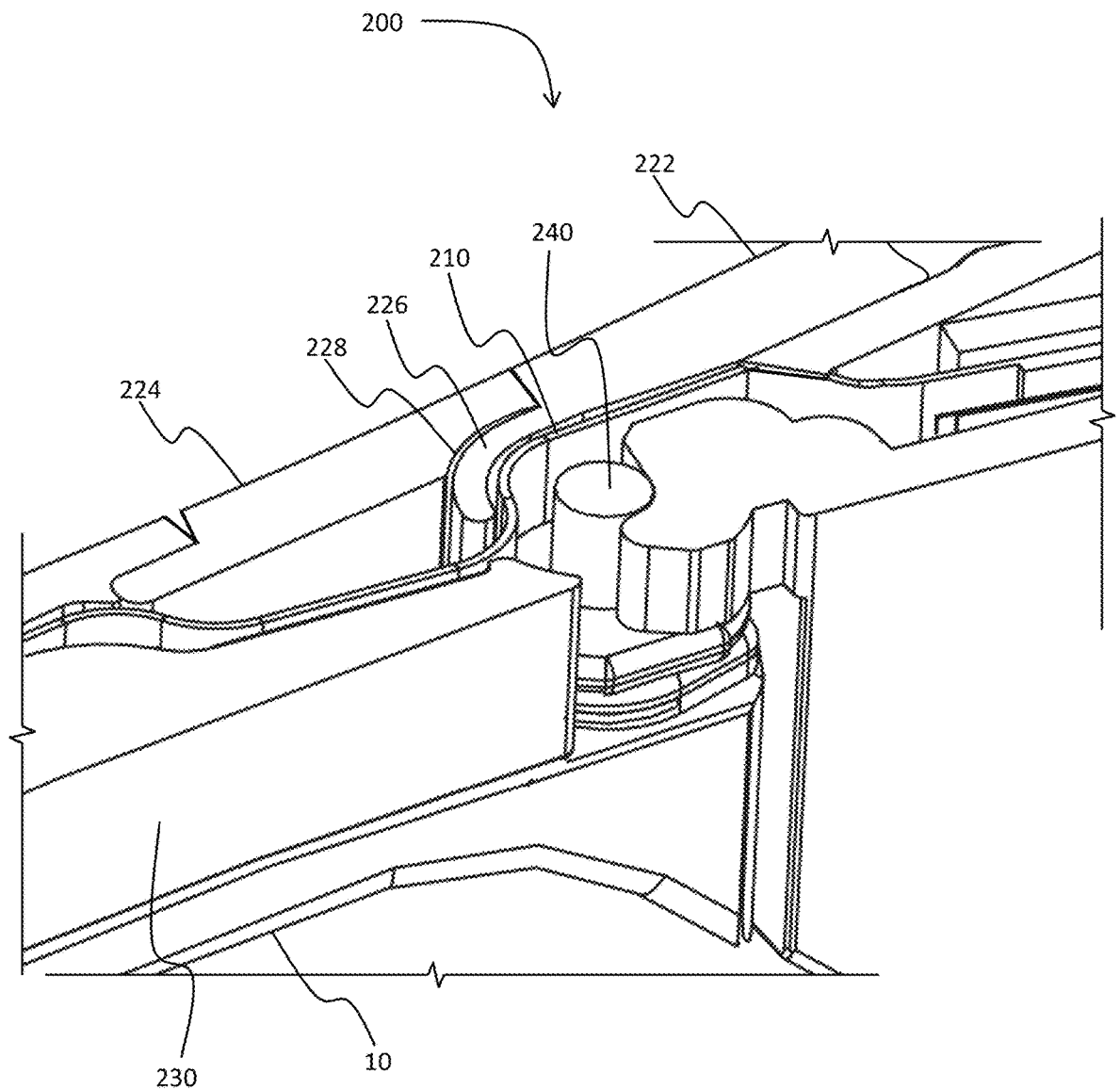
FIG. 21 is a perspective cross-sectional view of the hinge system of the augmented reality glasses.
Figure 22:
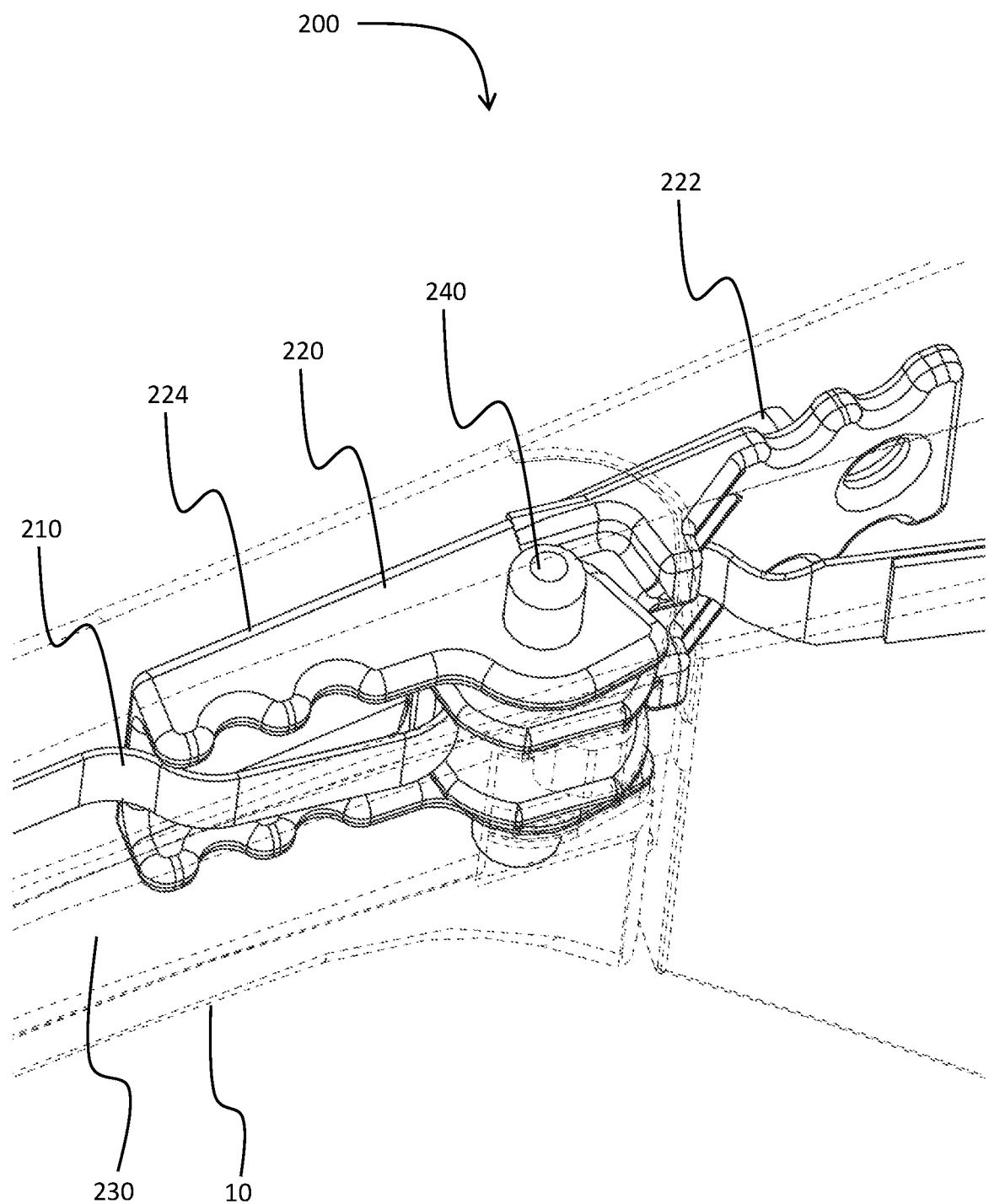
FIG. 22 is a perspective interior view of the hinge system of the augmented reality glasses.

Referring to FIGS. 15-17, the frame 10 of the augmented reality display system 100 may include a projector-waveguide-frame aligner 126 to reduce tolerance stack-up within the augmented reality display system 100. The projector-waveguide-frame aligner 126 may be a reference plane for the projection display device 70 and the waveguide stack module 80. The waveguide-frame aligner 87 and the projector-frame aligner 124 may abut the projector-waveguide-frame aligner 126 to decrease the overall tolerance stack up in the augmented reality display system 100.

Hinge System

Referring to FIGS. 18-24, the augmented reality display system 100 may also include a hinge system 200. The hinge system 200 may include a flex cable 210, a hinge 220, a hinge housing 230, and a hinge pin 240. Many challenges exist when designing a hinge system for flexible glasses, which include a hinge system that can pass through a flexible electronics circuit, remaining small enough to fit in the temple section of the glasses, and strong enough to withstand abuse from the user.

The hinge system 200 of the augmented reality display system 100 overcomes these challenges by its design, which is small enough to fit in the glasses while remaining flexible and having sufficient strength. The hinge 220 of the hinge system 200 may include a pair of metal injection molded hinge pieces, each hinge being insert molded into the frame 10 of the augmented reality display system 100. This may allow for the hinge 220 to be small enough within the frame 10, while also providing the necessary strength needed for the augmented reality display system 100.

The shape of the hinge 220 is unique in that the hinge 220 may allow the flex cable 210 to pass through the hinge 220, while covering and protecting the flex cable 210 throughout the rotation of the flex cable 210 and the right rear section 34 and/or the left rear section 36 of the frame 10 from a first position to a second position. The hinge 220 may include an inner hinge part 222 and an outer hinge part 224 that may be pivotally connected by the hinge pin 240 and remain rotatable. The shape of the inner hinge part 222 and the outer hinge part 224 of the hinge 220 may allow the inner hinge part 222 and the outer hinge part 224 to overlap one another (e.g., the inner hinge part 222 may include a protective tab 226 and the outer hinge part 224 may include a protective tab receiver 228) and be engaged to keep the flex cable 210 covered while remaining clear to rotate around the hinge pin 240.

Figure 23:
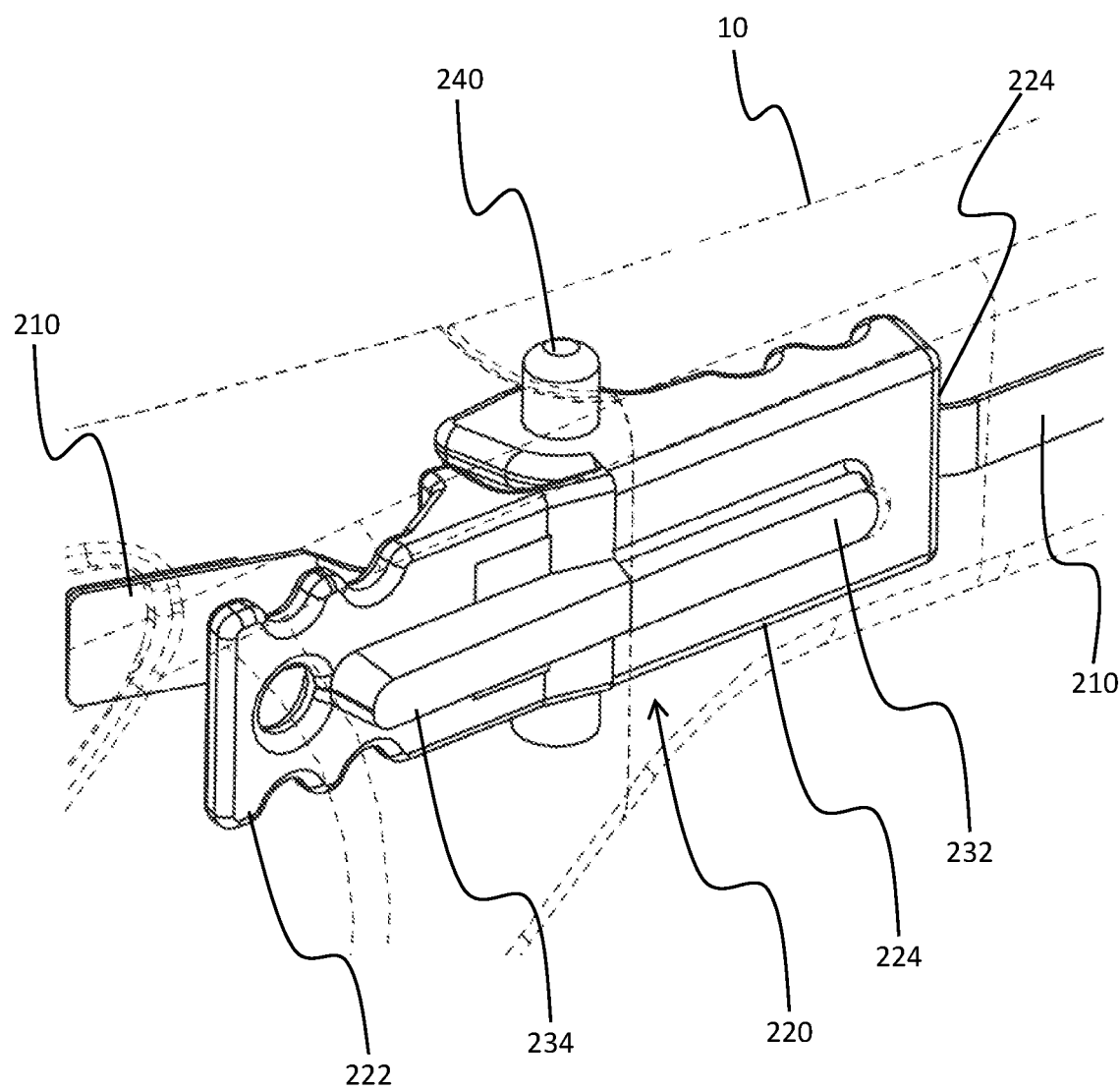
FIG. 23 is another perspective interior view of the hinge system in a first position.

Referring to FIG. 23, the hinge 220 is illustrated in a first position that may have the inner hinge part 222 and the outer hinge part 224 form a solid stop position in the first position. The outer hinge part 224 may include an outer stop tab 232 and the inner hinge part 222 may include an inner stop tab 234. In the first position, the inner hinge part 222 and the outer hinge part 224 of the hinge 220 may be substantially parallel with one another to be in line with the frame 10. In the first position, the augmented reality display system 100 may be in an "open" position. A portion of the hinge 220 may be exposed to the environment to provide the hinge 220 with a solid wall in the frame 10 to be pushed up against for location and/or alignment.

The flex cable 210 may be covered by hinge 220 at a joint location of the hinge system 200. The flex cable 210 may also be supported on either side by the frame 10 and the hinge housing 230. The frame 10 and the hinge housing 230 of the augmented reality display system 100 may also be pivotally connected to the hinge pin 240.

Figure 24:
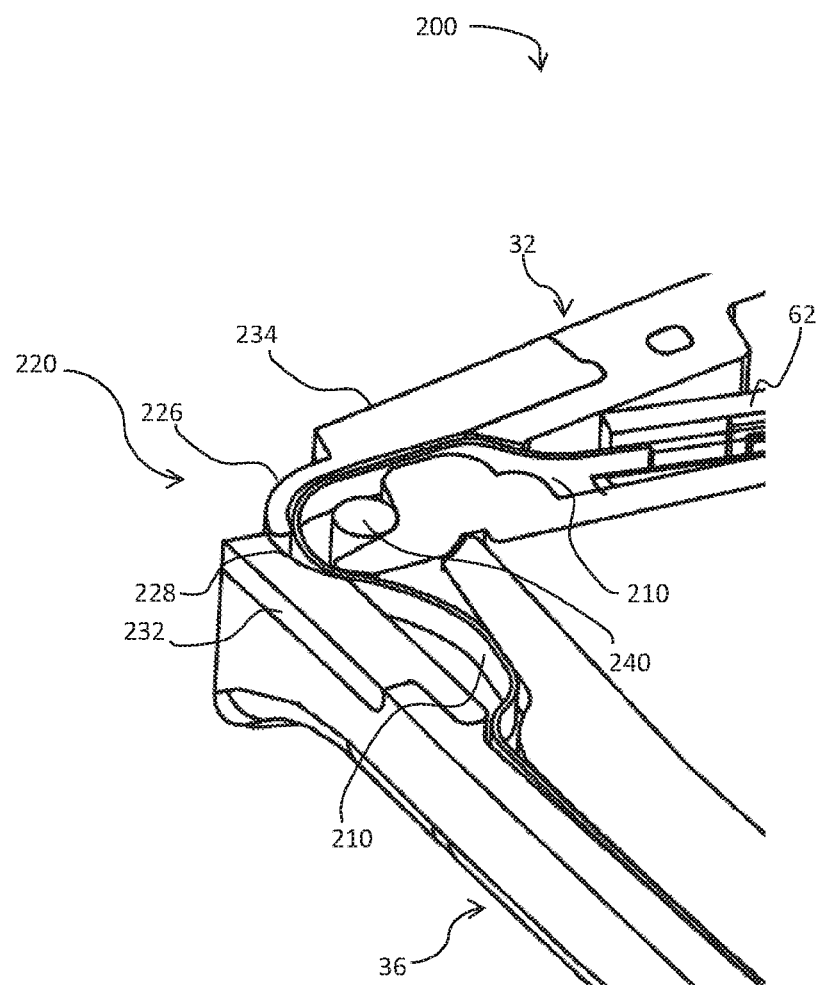
FIG. 24 is a perspective cross-sectional view of the hinge system in a second position.

Referring to FIG. 24, the hinge system 200 is illustrated in a second position. The second position of the hinge system 200 may be a bent or skewed position. The flex cable 210 may pass from the left rear section 36 through a gap near the axis of the hinge pin 240 and bend around the hinge pin 240 to pass into the left temple section 32 of the augmented reality display system 100. The flex cable 210 may also be attached to a left circuit board 62 of the augmented reality display system 100. The left circuit board 62 of the augmented reality display system 100 may be disposed in left temple section 32. The right circuit board 64 of the augmented reality display system 100 may be disposed in the right temple section 30. The frame 10, the hinge 220, and the hinge housing 230 may encapsulate the flex cable 210 that may keep the flex cable 210 from being exposed to the environment.

Though FIGS. 18-24 present the hinge system 200 on the left side L of the augmented reality display system 100, a similar "mirror image" of the hinge system 200 may be present on the right side R of the augmented reality display system 100.

Software Functionality

The augmented reality display system 100 may also display information of an application, with live data, without the user initiating or launching the application.

Referring to FIGS. 6A and 6B, the projection display device 70 and the waveguide stack module 80 of the augmented reality display system 100 may automatically provide the user with a live view of the application while an icon in a "rail" is focused/selected in an active icon position. The "rail" of the augmented reality display system 100 may be a portion of the image that may provide a view of icons (e.g., the icons may be in a row either vertically or horizontally). When the icon remains in the active icon position, an application widget may be automatically displayed in a widget area of the displayed screen (e.g., home screen), which may provide read-only information that may be available in the application.

The augmented reality display system 100 may further include at least one induction charge coil circuit (not shown) that may be disposed within the frame 10. The induction charge coil circuit may be electrically connected to the left circuit board 62 and to at least one battery (e.g., the right rear battery 50). The induction charge coil circuit may be used to charge one or more batteries of the augmented reality display system 100. The induction charge coil circuit may include several loops of conductive material that may be wrapped around inner perimeters of the right eye see-through section 20 and/or the left eye see-through section 22. The induction charge coil circuit may also be positioned within at least one of the right temple section 30, the left temple section 32, the right rear section 34, and the left rear section 36.

The present disclosure has been described with reference to an embodiment of the augmented reality display system 100. It is appreciated that locations of the components of the augmented reality display system 100 may be interchangeable from the left side L to the right side R and from the right side R to the left side L, together with suitable mirror transformations of the shapes of the components of the augmented reality display system 100. For example, the present disclosure describes the projection display device 70 and the waveguide stack module 80 as being on the right side of the augmented reality display system 100. However, the present disclosure also envisions the projection display device 70 and the waveguide stack module 80 to be on the left side of the augmented reality display system 100, and any other corresponding component necessary to achieve the reorientation, to provide the virtual images to the left eye of the user.

Artificial Intelligence Systems

Artificial intelligence systems may be utilized with the augmented reality display system 100. The artificial intelligence systems may be utilized for facial recognition, game playing (e.g., go, chess, etc.), medical diagnostics, robot maneuverability, and interaction with real-world objects. Additionally, deep learning systems (a type of artificial intelligence) may analyze user preferences and behaviors from data collected from user online interactions including shopping from online stores, social media websites, and e-mail systems.

There are benefits to the user of head-mounted display augmented reality systems that are configured to manage connectivity and interactions with multiple artificial intelligence systems at the same time. Such systems would be able to monitor the user's environment, actions, health, and well-being and provide feedback to the user to augment the user's information, awareness, and safety. These systems can develop personalized assistance to the user by monitoring and learning the user's behaviors and preferences and then responding accordingly based on the learned preferences and behaviors of the user.

The augmented reality display system 100 may include additional sensors that may be disposed on the circuit board 62 and/or the circuit board 64. The additional sensors may be, but are not limited to: proximity sensors (inward toward the wearer, and/or outward toward the environment that the wearer is within), ambient light brightness sensors, an audio microphone, temperature sensors, humidity sensors, GPS location components, magnetometers, accelerometers, head orientation sensors (e.g., tilt and tip direction), wearer's gaze direction sensors, etc. Data from the sensors may be collected by the processor 54 and applications that run thereon, and the data may be organized, formatted, and displayed to the wearer of the augmented reality display system 100 as a portion of a virtual image that may be overlaid on a real-world scene within the wearer's field of view. Additional information and data, e.g., compass direction of the wearer's gaze, GPS location, environment temperature, names of objects in the wearer's field of view, etc., may be obtained for formatting and display as a portion of a virtual image via communication protocols to other external devices and networks, e.g. Bluetooth, Wi-Fi, and/or other communication protocols.

Figure 26A:
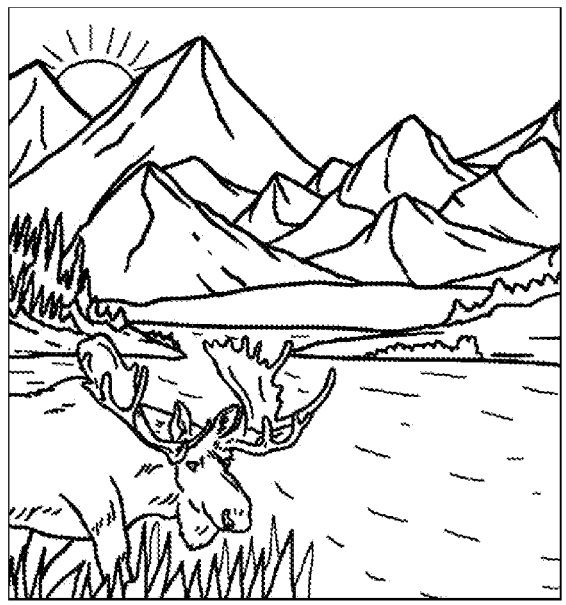
FIGS. 26A and 26B are images using the augmented reality glasses utilizing different capture modes.

FIG. 26A is an illustration of an image capture mode of the augmented reality display system 100 of FIG. 1. The camera assembly 12 and the processor 54 may provide different modes of operation for capturing images. In one mode of operation, the camera assembly 12 may capture a still image of a scene as illustrated in FIG. 26A. In another mode of operation, a continuous stream of images may be captured by the camera assembly 12 and the processor 54. In yet another mode of operation, the processor 54 may display data as a virtual image overlaid onto the real-world scene to at least one of the wearer's two eyes, such as object identification data for objects that appear in the wearer's field of view as well as other data from the sensors including the compass direction of the wearer's gaze, the environment temperature, the GPS location, etc. The camera assembly 12 and the processor 54 may also combine the real-world image captured by the camera assembly 12 and the data displayed to the wearer as a virtual image to obtain a final captured image that may be stored for future retrieval and/or transmitted to other devices.

Figure 26B:
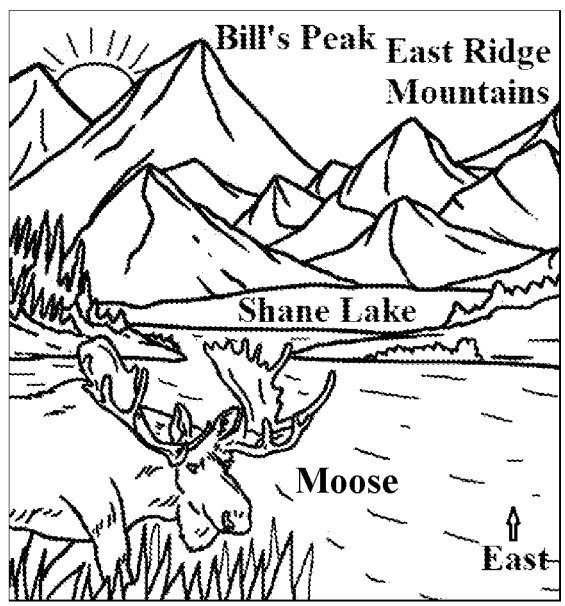

FIG. 26B is an illustration of a real-world camera captured image including the virtual image of data overlaid to form the final captured image. In another mode, the camera assembly 12 and the processor 54 may operate to provide a continuous video capture that combines real-world images in the camera assembly's 12 field of view with generated virtual images overlaid on the captured real-world images to form a final captured video.

Figure 27:
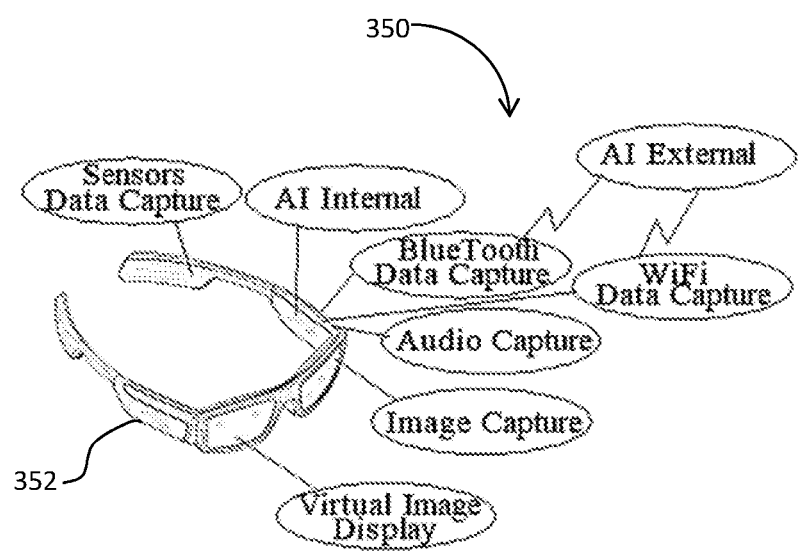
FIG. 27 is a perspective view of an augmented reality near-eye display system utilizing artificial intelligence and wireless communication.

FIG. 27 illustrates a head-mounted display augmented reality (HMD AR) near-eye display system 350 including an augmented reality (AR) near-eye display device 352. The AR near-eye display device 352 may include at least one internal artificial intelligence (AI) system that may be implemented with hardware and/or software within the AR near-eye display device 352. The at least one internal AI system may include in part, in whole, and/or in combination with one or more of: an expert system; a machine learning system; a deep learning system, a neural network based system; and/or other types of implementation suitable for the intended purpose and understood by one of ordinary skill in the art. The AR near-eye display device 352 may further include sensors such as a GPS sensor, head and/or visual gaze orientation sensors, etc., as well as network and interdevice communication modules that may include Bluetooth, Wi-Fi, and/or other communication protocols. Additionally, the AR near-eye display device 352 may include at least one camera and at least one audio microphone. The AR near-eye display device 352 may further include a display to convey a virtual image to the wearer that may be overlaid onto the real-world view of at least a portion of the wearer's field of view. The at least one internal AI system may be distributed having a portion of the at least one internal AI system on the AR near-eye display device 352 and a portion of the at least one internal AI system on an external device accessible through a network utilizing one or more communication protocols, e.g., a database associated with the at least one internal AI system that may be located in a cloud service while a voice command AI interface to the database may be located in the AR near-eye display device 352.

The at least one internal AI system may be a natural language processing system utilizing the at least one audio microphone of the AR near-eye display device 352. The natural language processing system may allow the wearer of the AR near-eye display device 352 to initiate commands that may change one or more operating parameters of the AR near-eye display device 352 by speaking voice commands.

The AR near-eye display device 352 may utilize Bluetooth and/or Wi-Fi communication modules to communicate with external networks, internet, cloud applications, etc. The wearer of the AR near-eye display device 352 may communicate with external AI applications through the natural language processing system internal to the AI system. The wearer may interact with both internal and external AI systems to enhance and/or aid the activity of the user. Utilization of the GPS sensors and image capture as well as the internal and external AI systems that process images for object identification may allow the user to identify objects in the wearer's environment, e.g., a device that is in need of repair. Communicating with the internal and/or external AI systems may facilitate the wearer in the repair of a device that is broken. For example, after identification of the device based in part on the device's location and the images of the device, the at least one internal AI system may determine the make and model of the device and initiate an inquiry to other networks, databases, and AI systems for additional data on the device, e.g., when the device had its last maintenance service, known common failures of this type of device, instructions on how to debug the current problem with the device, etc. The internal and external AI systems may interact with the wearer and provide instructions to the wearer for determining the failure of the device and how to fix the device. Both audio and visual data from the AR near-eye display device 352 may be transmitted to one or more AI systems to assist in the debugging and correction of the device.

Figure 28:
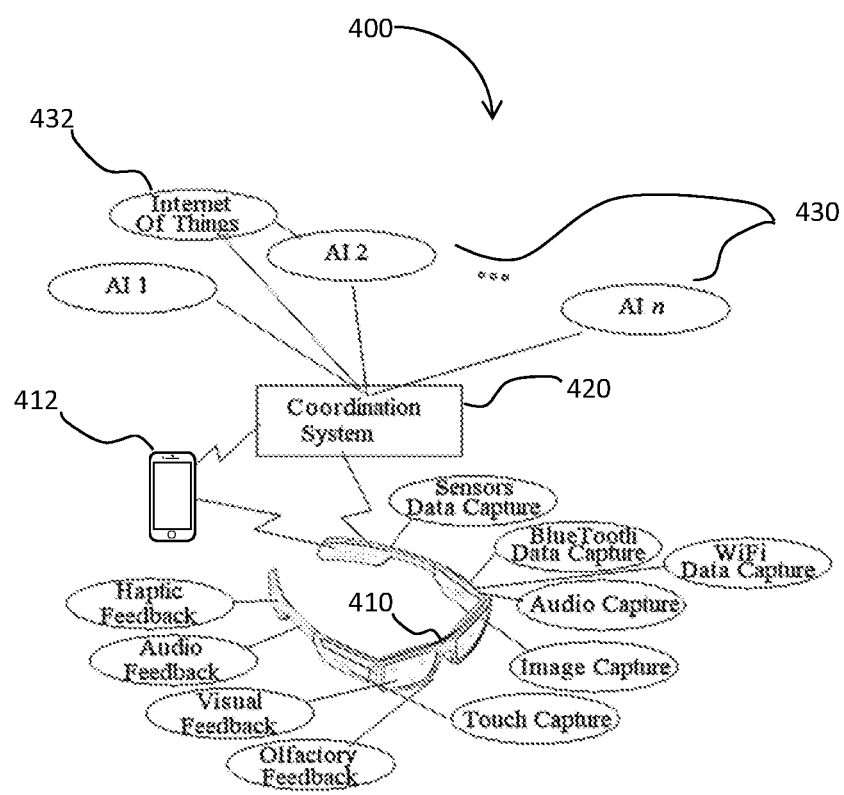
FIG. 28 is a perspective view of an augmented reality head-mounted display utilizing artificial intelligence and wireless communication.

FIG. 28 illustrates an HMD AR display system 400 including at least one AR smart glasses 410 and at least one AI system 430. The at least one AI system 430 may include hardware and/or software that may process and/or display one or more aspects of natural (e.g., human) intelligence, reasoning, knowledge of one or more topics, planning, learning, nature language processing (e.g., written and/or audio), spatial perception, facial recognition, etc. The AR smart glasses 410 may include at least two different categories of user and/or environment interaction: 1) Data acquisition, and 2) Feedback.

The data acquisition may include: 1) touch capture from one or more touch pads and/or buttons; 2) image capture from one or more cameras; 3) audio capture that may be used to capture the voice of the wearer and/or sound from the environment; 4) Wi-Fi data capture allowing communication between the AR smart glasses 410 and other Wi-Fi devices and/or networks; 5) Bluetooth data capture allowing communication between the AR smart glasses 410 and other Bluetooth devices and/or networks; 6) other data acquisition including sensors that include, but not limited to, GPS, magnetometer, accelerometer, barometer, temperature, heart rate sensor, gaze direction sensor, orientation sensors, motion sensors, etc.

The feedback to the wearer of the AR smart glasses 410 may include any one or combinations of: haptic, audio, visual, and/or olfactory.

The AR display system 400 may further include a coordination system 420. The coordination system 420 may be a part of the at least one AI system 430 and may provide coordination and interface protocols to the at least one AI system 430. The coordination system 420 may also provide coordination and interface to other network systems, e.g., to Internet of Things (IoT) 432. The IoT 432 may be the interconnection network through the internet connecting computing devices, software, sensors, and/or actuators embedded in physical objects enabling them to send and receive data. The coordination system 420 may be embedded/installed within the hardware and/or software of the AR smart glasses 410. The coordination system 420 may be a cloud computing application accessible by the AR smart glasses 410 via Bluetooth and/or Wi-Fi connectivity. The coordination system 420 may be embedded/installed in part on a smartphone 412. The smartphone 412 may be in communication with the AR smart glasses 410 via Bluetooth, Wi-Fi, other wireless communication protocol, and/or may be physically connected to the AR smart glasses 410 via at least one wire cable. The coordination system 420 may include hardware and/or software. The coordination system 420 may be partly distributed on the AR smart glasses 410, the smartphone 412, and/or a cloud application.

The AR smart glasses 410 may include at least one camera for image capture providing still images and/or a stream of images (e.g., video) to the coordination system 420. The coordination system 420 may process the images for facial recognition, identification of spatial real objects, etc. The coordination system 420 may initiate the processing of the images and/or video by passing the images to the at least one AI system 430. In one example, the coordination system 420 may initiate and pass the images to an AI system of the at least one AI system 430 for facial recognition, to a spatial aware AI for object identification, and to a language processing AI for character recognition and/or language translation. Resulting information from such, possibly multiple, AI processing may be received by the coordination system 420 that may then initiate the coordination of the received information into one or more suitable forms (e.g., haptic, audio, visual, and/or olfactory) to be presented to the wearer of the AR smart glasses 410.

The AR display system 400 may include a personal preference AI system, one of the at least one AI system 430, suitable for learning the wearer's habits and/or preferences. Data for such learning may come from at least one of: Historical data of the wearer's utilization of the AR smart glasses 410; User utilization of social media websites, e.g., Facebook, Twitter, etc.; Online shopping websites, e.g., Amazon; Professional websites, e.g., LinkedIn; etc. Additionally, the personal preference AI system may receive data, suitable for learning the wearer's preferences and/or habits, from multiple sensors and data sources, e.g., from a clock, a calendar, GPS sensor, and/or voice commands. By learning the habits of the wearer, e.g., when the wearer is going to work and what type of music the wearer prefers to listen to during the trip, the personal preference AI system may offer similar music to the wearer as well as filter news and/or advertisements to present information that the user may be interested in, which may be based on the behavioral and preference data. Other data for learning may come from other AI systems that monitor people's behavior, but not specifically the wearer of the AR smart glasses 410. Human behavior may be learned, in part, by statistical and other analysis of human behavior data (e.g., shopping data, online social media data, voting records, surveys, etc.) involving a large number of people. Utilizing such data may be part of the personal preference AI system.

Another AI system of the at least one AI system 430, or a combination of one or more AI systems of the at least one AI system 430, may include image processing, spatial awareness, and object recognition. Yet another AI system of the at least one AI system 430 may be suitable for recognizing hand gestures of the wearer and/or of other people. Another AI system of the at least one AI system 430 may be suitable for speech recognition. Yet another AI system of the at least one AI system 430 may be suitable for language translation. Another AI system of the at least one AI system 430 may be suitable for botany. The coordination system 420 may be configured, statically or dynamically, to answer questions, e.g.: "What is the name of that tree?" posed by the wearer while pointing to a particular tree. Utilizing the spatial aware AI, questions like "How far away is that tree?" or "How tall is that tree?" may be posed by the wearer and answered through the AR smart glasses 410. "Dynamically" may be defined as the coordination system 420 not having immediate or constant communication with all of the AI systems of the at least one AI system 430 needed to understand and answer the question posed by the wearer, but has the knowledge and capability to initiate communications with the necessary AI systems of the at least one AI system 430 suitable for answering the question. Once the question has been answered, there may not be any further need to communicate with a particular AI system of the at least one AI system 430. The coordination system 420 may then drop communication with the particular AI system of the at least one AI system 430.

A hand gesture AI system of the at least one AI system 430 may also be utilized to recognize sign language gestures (e.g., American sign language). The hand gesture AI system may be utilized to recognize commands to the coordination system 420 or to other components of the AR smart glasses 410, e.g., the touch pad 72.

One of the AI systems of the at least one AI system 430 may be a spatial awareness AI that knows the environment that the wearer is in. The spatial awareness AI may include a GPS location device for obtaining the GPS location of the wearer. A Bluetooth sensor of the AR smart glasses 410 may be used to identify Bluetooth beacons in the immediate environment of the wearer. Bluetooth beacons may include a hardware transmitter that broadcasts identification information. Thus, and for example, a business may setup the Bluetooth beacon for identification of the business. When the wearer of the AR smart glasses 410 enters the range of the Bluetooth beacon, the coordination system 420 may be alerted to the Bluetooth beacon and may initiate commands to other AI systems of the at least one AI system 430 to obtain additional information, format the information, and present the formatted information to the wearer. For example, the coordination system 420 may query the IoT, other networks, and/or databases, for further information about the business associated with the particular Bluetooth beacon. The coordination system 420 may additionally query the personal preference AI system to determine if the wearer is likely to be interested in the business. If the wearer is likely to be interested, the coordination system 420 may query the spatial awareness AI for distance and directions to the business. The coordination system 420 may then alert the wearer of the business and how close the business is to wearer's current location, how to get to the business, and/or a short list (e.g., visual or audio) of items offered by the business. Additionally, the coordination system 420 may further query the internet to determine hours of operation of the business as well as possible special sale information.

Location aware AI of the at least one AI system 430 may offer weather conditions, expected weather conditions, and/or alerts (e.g., tornado warnings) to the wearer. Additionally, the location aware AI may determine that an acquaintance that the wearer interacts with via social media, email, and/or in person, is in the vicinity and may alert the wearer of the acquaintance's proximity to the wearer. The wearer may then direct the coordination system 420 to make contact with the acquaintance by requesting a meeting. Additionally, the coordination system 420 may provide directions to the acquaintance. Alternatively, the wearer may instruct the coordination system 420 to block further information about the acquaintance.

The coordination system 420 may determine that the information required has previously been obtained by another person and is available on the internet or some other accessible network. In such cases, the coordination system 420 may elect to use the information available rather than initiate communication with the at least one AI system 430 for calculating the needed information.

The coordination system 420 may initiate mapping of the immediate environment of the wearer and may make such environmental information available for utilization by other users. In this way, the wearer may assist in providing up-to-date data of the specific environments that the wearer traveled to other wearers of similar AR display systems and/or to other AI systems.

A behavioral AI system of the at least one AI system 430 may also be utilized to assist the wearer in modifying the wearer's behavior. For example, the behavioral AI system may monitor how much exercise the wearer gets during the day and may schedule additional exercise for the wearer according to health AI recommendations. Additionally, the behavioral AI system may couple with a diet/nutrition AI system of the at least one AI system 430 to recommend meals based on previous meals that the wearer has already eaten. The behavioral AI system may assist the wearer in adjustment of "bad" habits, e.g., smoking, by suggesting alternatives to the wearer.

A spatial aware AI system of the at least one AI system 430 may assist the wearer in identifying and notifying the wearer of hazards in the wearer's environment, e.g., oncoming cars as the wearer is crossing a street. Additionally, the coordination system 420 may coordinate the data from the AR smart glasses 410 sensors and/or the camera assembly 12. The coordination system 420 may further coordinate the data from the AR smart glasses 410 with other sensors in the wearer's environment by passing data to of the at least one AI system 430 for monitoring the wearer's environment for hazards including chemical hazards, hazardous objects in the environment (e.g., loose animals, poisonous snakes, spiders, etc.), holes in the ground, and other debris in the environment.

The invention has been described in detail with particular reference to a present preferred embodiment, but it will be understood that variations and modifications can be effected within the spirit and scope of the invention. The presently disclosed embodiments are therefore considered in all respects to the illustrative and not restrictive. The scope of the invention is indicated by the appended claims, and all changes that come within the meaning and range of equivalents thereof are intended to be embraced therein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

What is claimed is:

1. A personal display device for displaying virtual images to a wearer, comprising:
    a frame having one or more temple sections;
    a battery arranged within the one or more temple sections;
    a projection display device connected to the frame operable to project image-bearing light beams;
    a processor connected to the projection display device and arranged within the one or more temple sections;
    a circuit board arranged within the one or more temple sections;
    at least one waveguide stack module connected to the frame, the at least one waveguide stack module configured to receive the image-bearing light beams from the projection display device, the at least one waveguide stack module including:
        an in-coupling diffractive optic formed along the at least one waveguide stack module operable to diffract at least a portion of the image-bearing light beams from the projection display device into the at least one waveguide stack module in an angularly encoded form; and
        an out-coupling diffractive optic formed along the at least one waveguide stack module operable to diffract at least a portion of the image-bearing light beams from the at least one waveguide stack module in an angularly decoded form;
    a heat spreader system arranged within the one or more temple sections, comprising a heat conductive sheet arranged between at least a portion of the processor and at least a portion of the battery.

2. The personal display device of claim 1, further comprising a vibrator connected to the processor, the vibrator being configured to receive input vibrator signals from the processor to provide haptic feedback to the wearer.

3. The personal display device of claim 1, further comprising a right eye see-through section and a left eye see-through section; a nose bridge section arranged between the right eye see-through section and the left eye see-through section; and a nose bridge assembly detachably secured to the nose bridge section.

4. The personal display device of claim 3, wherein the nose bridge assembly further comprises:
    a lens securing assembly,
    wherein the lens securing assembly is configured to connect a lens with the nose bridge section, and wherein the lens is arranged between the at least one waveguide stack module and the wearer.

5. The personal display device of claim 4, further comprising a flexible cable arranged at least partially through the nose bridge section, wherein the one or more temple sections include a right temple section and a left temple section, wherein the flexible cable is configured to electrically connect one or more electronics arranged within the right temple section and the left temple section.

6. The personal display device of claim 1, further comprising an ambient light sensor connected to the frame and the processor to detect a change in ambient light.

7. The personal display device of claim 6, wherein the ambient light sensor is configured to provide signals to the processor; wherein the processor is configured to change the image conveyed by the projection display device based on the signals provided by the ambient light sensor.

8. The personal display device of claim 1, wherein the waveguide stack module comprises a waveguide housing, the waveguide housing being configured to house the in-coupling diffractive optic and the out-coupling diffractive optic.

9. The personal display device of claim 8, wherein the waveguide housing comprises a waveguide-frame aligner operable to align the waveguide housing and the frame.

10. The personal display device of claim 8, wherein the waveguide stack module comprises an outer cover and an inner cover arranged to seal the in-coupling diffractive optic and the out-coupling diffractive optic within the waveguide housing, a seal located about a perimeter of the outer cover configured to seal the outer cover to the waveguide housing; and a gasket sealing the inner cover to the waveguide housing.

11. The personal display device of claim 1, wherein the waveguide stack module comprises a blackening material operable to absorb at least a portion of excess light from the projection display device that goes past the in-coupling diffractive optic; wherein the blackening material comprises komoto, carbonfeather, Aktar, or black paints.

12. The personal display device of claim 1, wherein the projection display device comprises a projector, a projector mounting frame, and a display connection module; wherein the display connection module is a prism assembly.

13. The personal display device of claim 12, wherein the projector mounting frame comprises an alignment pin and a projector-frame aligner, the projector-frame aligner operable to align the projector mounting frame and the frame, wherein the projector includes an alignment aperture configured to receive the alignment pin.

14. The personal display device of claim 1, wherein the waveguide stack module comprises a waveguide housing having a waveguide-frame aligner operable to align the waveguide housing and the frame, wherein the projection display device includes a projector-frame aligner aligning the projection display device and the frame, and wherein the frame includes a projector-waveguide-frame aligner configured to align the waveguide-frame aligner and the projector-frame aligner to the frame.

15. The personal display device of claim 1, wherein the one or more temple sections include a right temple section and a left temple section, further comprising:
    a right rear section connected to the right temple section;
    a left rear section connected to the left temple section;
    a left hinge system positioned between the left temple section and the left rear section; and
    a right hinge system positioned between the right temple section and the right rear section.

16. The personal display device of claim 15, further comprising a first battery secured to the right rear section; and a second battery secured to the left rear section, wherein at least one of the left hinge system and the right hinge system comprises a flex cable, a hinge, a hinge housing, and a hinge pin, and wherein the flex cable is arranged through the hinge and is connected to the first battery or the second battery.

17. The personal display device of claim 16, wherein the hinge comprises a first half hinge and a second half hinge, the first half hinge and the second half hinge being configured to be pivotally connected by the hinge pin, and wherein the first half hinge includes a tab and the second half hinge includes a tab receiver, whereby the flex cable is covered when the second half hinge is pivoted relative to the first half hinge.

18. The personal display device of claim 1, further comprising a user input device in signal communication with the processor; and a natural language processing system utilizing the user input device.

19. A personal display device for displaying virtual images to a wearer, comprising:
   a frame having a temple section;
   a battery arranged within the temple section;
   a projection display device connected to the frame operable to project image-bearing light beams;
   a processor connected to the projection display device and arranged within the temple section;
   at least one waveguide stack module connected to the frame, the at least one waveguide stack module configured to receive the image-bearing light beams from the projection display device, the at least one waveguide stack module including:
      an in-coupling diffractive optic formed along the at least one waveguide stack module operable to diffract at least a portion of the image-bearing light beams from the projection display device into the at least one waveguide stack module in an angularly encoded form; and
      an out-coupling diffractive optic formed along the at least one waveguide stack module operable to diffract at least a portion of the image-bearing light beams from the at least one waveguide stack module in an angularly decoded form;
   a heat spreader system arranged within the temple section, comprising a first heat conductive sheet arranged between at least a portion of the processor and an inner surface of the temple section, and a second heat conductive sheet arranged between at least a portion of the processor and at least a portion of the battery, and a thermal insulator arranged at least partially between the second heat conductive sheet and the battery.

20. The personal display device of claim 1, further comprising a second heat conductive sheet arranged between at least a portion of the battery and an inner surface of the one or more temple sections.

* * * * *